(12) United States Patent
Redford

(10) Patent No.: US 8,603,786 B2
(45) Date of Patent: *Dec. 10, 2013

(54) SYSTEM FOR PRODUCTION OF ETHANOL AND CO-PRODUCTS WITH APPARATUS FOR SOLVENT WASHING OF FERMENTATION PRODUCT

(75) Inventor: Steven G. Redford, Brandon, SD (US)

(73) Assignee: Poet Research, Inc., Sioux Falls, SD (US)

(*) Notice: Subject to any disclaimer, the term of this patent is extended or adjusted under 35 U.S.C. 154(b) by 580 days.

This patent is subject to a terminal disclaimer.

(21) Appl. No.: 12/646,746

(22) Filed: Dec. 23, 2009

(65) Prior Publication Data

US 2010/0159550 A1 Jun. 24, 2010

Related U.S. Application Data

(60) Provisional application No. 61/140,454, filed on Dec. 23, 2008, provisional application No. 61/161,342, filed on Mar. 18, 2009, provisional application No. 61/161,622, filed on Mar. 19, 2009, provisional application No. 61/161,684, filed on Mar. 19, 2009, provisional application No. 61/162,097, filed on Mar. 20, 2009, provisional application No. 61/168,331, filed on Apr. 10, 2009, provisional application No. 61/179,347, filed on May 18, 2009, provisional application No. 61/179,348, filed on May 18, 2009.

(51) Int. Cl.
C12P 7/06 (2006.01)
C12P 7/08 (2006.01)
C12P 1/00 (2006.01)
B65G 15/00 (2006.01)

(52) U.S. Cl.
USPC ........... 435/161; 435/163; 435/289.1; 406/47

(58) Field of Classification Search
None
See application file for complete search history.

(56) References Cited

U.S. PATENT DOCUMENTS

| | | | |
|---|---|---|---|
| 2,132,250 A * | 10/1938 | Wagner | 435/162 |
| 4,309,254 A | 1/1982 | Dahlstrom et al. | |
| 4,617,270 A | 10/1986 | Anderson et al. | |
| 4,857,279 A | 8/1989 | Kawamata et al. | |
| 5,250,182 A | 10/1993 | Bento et al. | |
| 5,510,463 A | 4/1996 | Takahashi et al. | |
| 5,620,728 A | 4/1997 | Langley et al. | |
| 6,755,975 B2 | 6/2004 | Vane et al. | |
| 7,122,709 B2 | 10/2006 | Fanselow et al. | |
| 7,297,236 B1 | 11/2007 | Vander Griend et al. | |
| 7,452,425 B1 | 11/2008 | Langhauser | |
| 2004/0234649 A1 | 11/2004 | Lewis et al. | |
| 2005/0101700 A1 | 5/2005 | Riebel | |
| 2005/0233030 A1 | 10/2005 | Lewis et al. | |
| 2005/0239181 A1 | 10/2005 | Lewis et al. | |
| 2007/0031954 A1 | 2/2007 | Mairal et al. | |
| 2007/0037267 A1 | 2/2007 | Lewis et al. | |
| 2007/0178567 A1 | 8/2007 | Lewis et al. | |
| 2007/0196907 A1 | 8/2007 | Lewis et al. | |
| 2007/0202214 A1 | 8/2007 | Lewis et al. | |
| 2008/0176298 A1 | 7/2008 | Randhava et al. | |
| 2008/0213429 A1 | 9/2008 | Binder et al. | |
| 2009/0181153 A1 | 7/2009 | Bendorf et al. | |
| 2010/0159071 A1 * | 6/2010 | Redford | 426/20 |
| 2010/0159514 A1 * | 6/2010 | Redford | 435/71.1 |
| 2010/0159548 A1 * | 6/2010 | Redford | 435/161 |
| 2010/0159549 A1 * | 6/2010 | Redford | 435/161 |
| 2010/0159550 A1 | 6/2010 | Redford | |
| 2010/0159551 A1 * | 6/2010 | Redford | 435/161 |
| 2011/0111085 A1 | 5/2011 | Lewis et al. | |
| 2011/0143013 A1 | 6/2011 | Lawton | |

FOREIGN PATENT DOCUMENTS

| | | |
|---|---|---|
| JP | 60-106820 | 6/1985 |
| WO | WO 2010/075541 A2 | 7/2010 |

OTHER PUBLICATIONS

McKenna, Barrie "Ethanol Helps a Small Town Bloom" Toronto Globe and Mail, Jul. 25, 2007, cited in Scrippsnews <URL: http://www.scrippsnews.com/node/25654>, 3 pages.*
Ayers, Vickie "The 'Can Do' Review" Todd & Sargent Inc. Jan. 2007, 31(1), 8 pages.*
US-EPA "Draft Regulatory Impact Analysis: Changes to Renewable Fuel Standard Program" EPA-420-D-09-001, May 2009, 822 pages.*
Wakeman, R. J. "Extraction, Liquid-Solid" Kirk-Othmer Encyclopedia of Chemical Technology, Dec. 4, 2000, pp. 1-14.*
Mustakas, G.C. "Recovery of Oil from Soybeans" USDA NRRC-ARSEA, in Handbook of Soy Oil Processing and Utilization, Am. Soybean Assn. and Am. Oil Chemists; Soc., 1980, Chapter 4, pp. 49-65.*
Lawton, "Isolation of Zein Using 10% Ethanol" Cereal Chem, 83(5):565-568, 2006.
Wolf et al., "Isolation and Characterization of Zein from Corn Distillers' Grains and Related Fractions." Cereal Chem, 74(5):530-536, 1997.

(Continued)

Primary Examiner — Chris R Tate
Assistant Examiner — Aaron J Kosar
(74) Attorney, Agent, or Firm — Foley & Lardner LLP

(57) ABSTRACT

A system for the production of ethanol and co-products is provided. The system facilitates an overall reduction in the use of energy, for example, by reducing the mass of wet solids supplied to a distillation system. The system also reduces the amount of energy used to dry the wet solids component of a fermentation product, for example, by increasing the ethanol concentration of the wet solids. The system also facilitates the recovery of co-products including bioproducts and other biochemicals extracted from components of the fermentation product. The solids component of the fermentation product may be dried and constituted into a meal that may be used for animal feed, among other uses.

15 Claims, 27 Drawing Sheets

(56) References Cited

OTHER PUBLICATIONS

Parris, et al., "Extraction and Solubility Characteristics of Zein Proteins from Dry-Milled Corn," J. Agric. Food Chem., (2001), 49:3757-3760.

Cookman et al., "Extraction of protein from distiller's grain", Biosource Technology, 100 (2009), 2012-2017.

Egorova et al., "Different Methods for Preparing a Feed Meal from Fresh and Acid-Preserved Fish Scraps", Tr. Vses. Nauchno.-Issled. Inst. Morsk. Rybn. Khoz. i Okeanogr (Proceedings of the All-Union Research Institute of Marine Fisheries and Oceanography), 1962, vol. 45, pp. 134-8 (CA English Abstract only).

Jacela et al., "Amino acid digestibility and energy content of corn distillers meal for swine", Available online at www.asi.ksu.edu on Oct. 24, 2007, Proceedings of the Kansas State University Swine Day, pp. 137-141.

Winowiski, "Pellet quality in animal feeds", Available online at www.adiveter.com on Jan. 31, 2001, Technical Bulletin, Am. Soybean Assn, FT21-1995, pp. 1-5.

Wu et al., "Evaluation of corn distillers' dried grains defatted with supercritical carbon dioxide", Cereal Chem. 1990, 67(6), pp. 585-588.

Office Action for U.S. 12/646,647 dated Mar. 6, 2012.
Office Action for U.S. 12/646,647 dated Sep. 26, 2012.
Office Action for U.S. 12/646,720 dated Mar. 20, 2012.
Office Action for U.S. 12/646,720 dated Oct. 5, 2012.
Office Action for U.S. 12/646,796 dated Feb. 24, 2012.
Office Action for U.S. 12/646,796 dated Sep. 4, 2012.
Office Action for U.S. 12/646,766 dated May 15, 2012.
Office Action for U.S. 12/646,695 dated Mar. 20, 2012.

* cited by examiner

SYSTEM FOR PRODUCTION OF ETHANOL AND CO-PRODUCTS WITH APPARATUS FOR SOLVENT WASHING OF FERMENTATION PRODUCT

CROSS REFERENCE TO RELATED APPLICATIONS

This application claims priority from and the benefit of and incorporates by reference, each of the following: (a) U.S. Provisional Application Ser. No. 61/140,454, entitled FORMING DRIED SOLID FROM A FERMENTATION PROCESS, filed Dec. 23, 2008; (b) U.S. Provisional Application Ser. No. 61/161,342, entitled PROCESS FOR LOW ENERGY DRYING OF ETHANOL FERMENTATION SOLIDS, filed Mar. 18, 2009; (c) U.S. Provisional Application Ser. No. 61/161,622, entitled PROCESS FOR LOW ENERGY DRYING OF ETHANOL FERMENTATION SOLIDS, filed Mar. 19, 2009; (d) U.S. Provisional Application Ser. No. 61/161,684, entitled LOW ENERGY DRYING OF ETHANOL FERMENTATION SOLIDS WITH REDUCTION OF NON-FERMENTABLE INPUTS, filed Mar. 19, 2009; (e) U.S. Provisional Application Ser. No. 61/162,097, entitled LOW ENERGY DRYING OF ETHANOL FERMENTATION SOLIDS WITH MULTIPLE ETHANOL FEEDS, filed Mar. 20, 2009; (f) U.S. Provisional Application Ser. No. 61/168,331, entitled PROCESS FOR PRODUCING ETHANOL, filed Apr. 10, 2009; (g) U.S. Provisional Application Ser. No. 61/179,347, entitled PROCESS FOR PRODUCING ETHANOL, filed May 18, 2009; and (h) U.S. Provisional Application Ser. No. 61/179,348, entitled PROCESS FOR PRODUCING ETHANOL, filed May 18, 2009.

BACKGROUND

Ethanol can be produced from grain-based feedstocks (such as corn), cellulosic feedstocks (such as switchgrass or corn cobs), or other plant material (such as sugar cane).

In a conventional ethanol plant producing ethanol from corn, corn kernels are processed to separate the starch-containing material (e.g. endosperm) from other matter (such as fiber and germ). The starch-containing material is then slurried with water and liquefied to facilitate saccharification where the starch is converted into sugar (i.e. glucose) and fermentation where the sugar is converted by an ethanologen (i.e. yeast) into ethanol. The product of fermentation is beer, which comprises a liquid component containing ethanol and water (among other things) and a solids component containing unfermented particulate matter (among other things).

According to the process typically used at a conventional ethanol plant, the liquefaction of the starch-containing material is done by "cooking" the slurry at temperature at or near boiling point of water. According to an alternative process (that has been developed and implemented by the assignee of the present application), for example, as described in U.S. Patent Application Publication No. 2005/0239181, raw starch may be converted and fermented without "cooking" or liquefication.

In a conventional ethanol plant, the liquid component and solids component of the fermentation product is sent to a distillation system. In distillation, the fermentation product is processed into, among other things, ethanol and stillage containing wet solids (i.e. the solids component of the beer with substantially all ethanol removed) formed into a wet cake which can be dried into distillers dried grains (DDG) and sold as an animal feed product. Other co-products, for example, syrup (and oil contained in the syrup) can also be recovered from the stillage. Water removed from the fermentation product in distillation can be treated for re-use at the plant.

In a conventional ethanol plant, certain plant operations are conducted at elevated temperatures over ambient temperature with the resultant consumption of energy. For example, the liquefaction of the starch-containing slurry is typically done with a jet cooker (using natural gas as a fuel to elevate the temperature of the slurry to a boil). The amount of energy used in the distillation process (another operation performed at an elevated temperature, with heat typically provided by steam from an on-site boiler) is a function, among other things, the volume/mass of material supplied to the distillation system. The drying of wet solids into distillers dried grains, an operation in which water is removed from the solids typically in a dryer (such as a ring dryer) heated by natural gas, will consume energy as a function of the properties (e.g. heat capacity, heat of vaporization and boiling point) of the water to be removed from the solids.

It would be advantageous provide for a system for producing ethanol that facilitates an overall reduction in the use of energy at the plant, for example, by reducing the mass of wet solids supplied to the distillation system. It would also be advantageous to provide for a system for producing ethanol that reduced the amount of energy used to dry the wet solids component of the fermentation product. It would further be advantageous to provide for a system for producing ethanol that facilitated the recovery of co-products including bioproducts and other biochemicals extracted from components of the fermentation product. It would further be advantageous to provide for a system for producing ethanol in which the solids component of the fermentation product would be dried and constituted into a meal that could be used for animal feed, among other uses.

SUMMARY

The present invention relates to a system and method for processing a fermentation product of a fermentation process in a biorefinery that performs distillation of ethanol, the fermentation product comprising a liquid component and a solids component, the method comprising the steps of: (a) depositing at least the solids component on an apparatus comprising a belt, (b) as the solids component is along the apparatus, applying a solvent to the solids component, and (c) drying the solids component.

DRAWINGS

DETAILED DESCRIPTION

Figure 1:
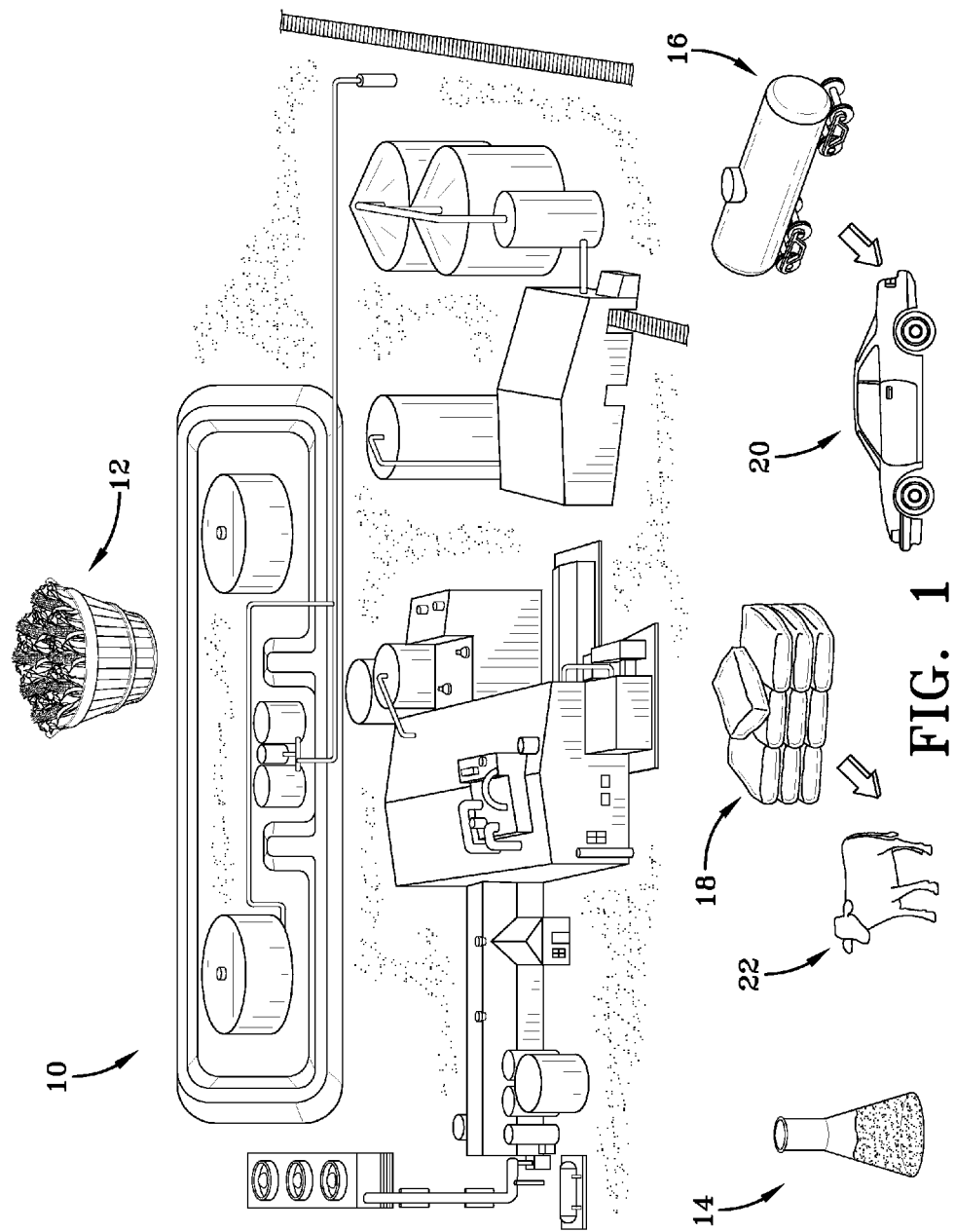
FIG. 1 is a process flow diagram of an exemplary embodiment of a biorefinery.

FIG. 1 is a process flow diagram of an exemplary embodiment of a biorefinery 10. Biorefinery 10 receives a feedstock, illustrated as corn 12, and processes the feedstock to produce several usable products for consumption, principally ethanol. Although illustrated as corn 12, other types of feedstock such as sorghum, wheat, barley, potatoes, sugar cane, switchgrass, and corn cobs, may be processed by biorefinery 10. Additional inputs such as enzymes, yeast, water, and energy (e.g., heat energy) may be added to the feedstock to facilitate production of the usable products. The usable products from biorefinery 10 may include bioproducts 14, such as corn oil, corn syrup, bran, flour, proteins (e.g., zein), and other suitable bioproducts, ethanol 16, and an animal feed 18 shown as distillers dried grain (DDG) for an animal 22.

Ethanol 16 is an alcohol produced from corn 12 or other starch-based crop. Ethanol 16 has many uses, and of particular interest is its capacity to be blended with gasoline for use in motor vehicles 20. Ethanol 16 is a relatively clean-burning, high-octane fuel that may be produced domestically in the United States from renewable sources, reducing the dependence on foreign sources of energy. Ethanol 16 also delivers economic vitality to agricultural regions where the feedstocks are produced. Ethanol blends increase fuel octane ratings, decrease harmful fossil fuel emissions, reduce fuel costs, and extend the overall supply of gasoline.

Figure 2:
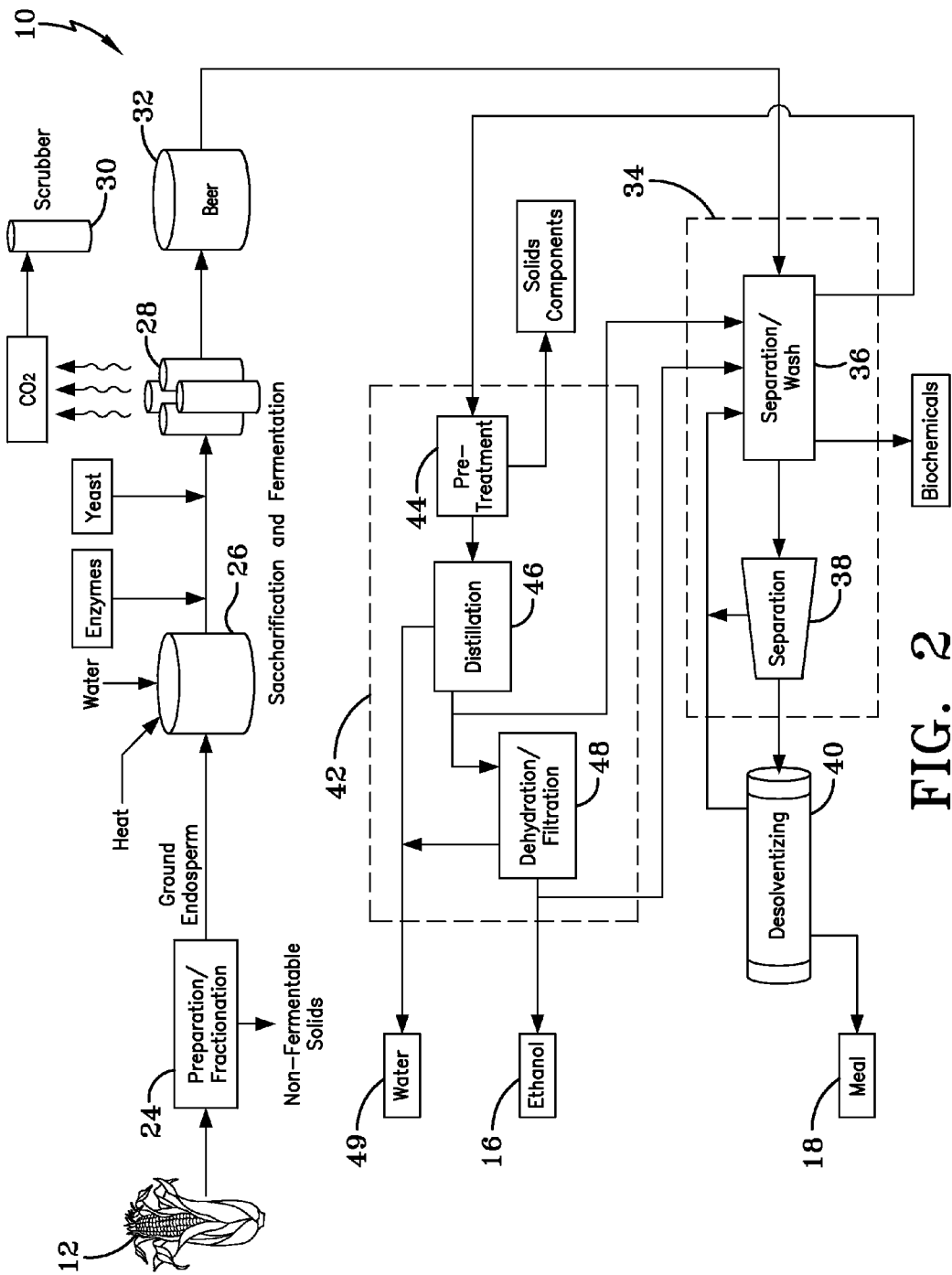
FIG. 2 is a process flow diagram of an exemplary embodiment of the biorefinery of FIG. 1.

FIG. 2 is a process flow diagram of an exemplary embodiment of biorefinery 10 of FIG. 1. Corn 12 may be directed into a preparation/fractionation process 24, where corn kernels of corn 12 may be separated into non-fermentable solids (e.g., germ and fiber) and fermentable solids (e.g., endosperm). Once the endosperm has been separated from the non-fermentable solids, the endosperm may be ground into ground endosperm, which may be directed into a saccharification process 26. Separation and grinding of endosperm may also be conducted in an integrated process. Saccharification process 26 may also receive additional inputs (e.g., heat, water, and enzymes) and may convert starches within the ground endosperm into sugars, which may be suitable for fermenting. A fermentation slurry may be directed from saccharification process 26 into a fermentation process 28.

Fermentation process 28 may also receive additional inputs (e.g., yeast and enzymes) and may ferment the sugars within the fermentation slurry to produce a certain concentration of ethanol within the fermentation slurry. Fermentation process 28 may produce a certain amount of carbon dioxide ($CO_2$) and other gases, which may be processed through the use of a scrubber 30 or other suitable equipment. The main product of fermentation process 28 is a fermentation product shown as beer 32 comprises a liquid component and a solids component and is generally a mixture of ethanol, water, syrup, particulate matter, and dissolved solids. Saccharification process 26 and fermentation process 28 may be performed separately, or according to certain embodiments, may be combined into a substantially integrated process (e.g., called simultaneous saccharification and fermentation (SSF)).

Beer 32 may be directed into solids processing system 34, which may wash beer 32 with ethanol (or other solvent). Solids processing system 34 of FIG. 2 include a separation/wash process 36, a separation process 38, and a desolventizing process 40. Beer 32 may be separated into a liquid component and a solids component by separation/wash process 36. The liquid component from separation/wash process 36 may be processed by a series of distillation system 42, which primarily produce ethanol 16. Distillation system 42 may include a distillation pre-treatment process 44, a distillation process 46, and a dehydration/filtration process 48. Distillation pre-treatment process 44 may remove wet solids components from the liquid component before distillation process 46 produces ethanol, which may be dried within dehydration/filtration process 48 to remove any remaining water 49. Dehydration/filtration process 48 may include any suitable type of dehydration, such as dessication. Water 49 removed from distillation system 42 may be used as make-up water, as a slurry water source, or as a source of water for other processes internal or external to biorefinery 10.

The solids component comprises ethanol, water, syrup, meal, zein, lutein, lysine, various proteins (having different attributes and nutritional values), yeast, fiber, and other particulate matter and dissolved solids. The solids component may be processed through solids processing system 34, which primarily produces meal 18 and several biochemicals, such as zein and xanthophylls. Ethanol 16 from distillation process 46 and/or dehydration/filtration process 48 may be used in separation/wash process 36 to wash the solids component with ethanol, increasing the ethanol concentration of the solids component and reducing the energy required to desolventize the solids component in the desolventizing process 40 to produce meal 18. Liquids removed by separation process 38 and desolventizing process 40 may be directed to separation/wash process 36.

Figure 3:
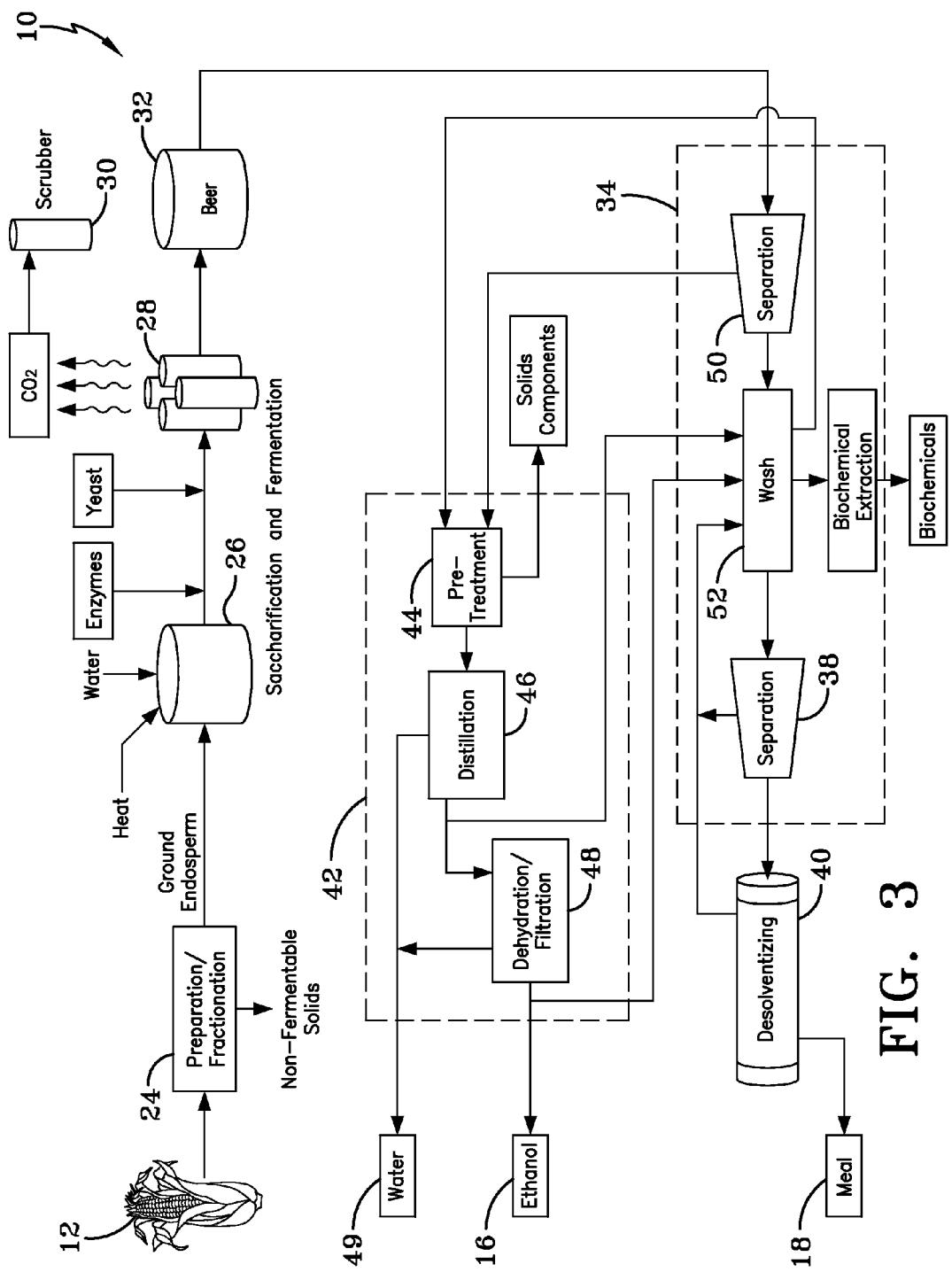
FIG. 3 is a process flow diagram of an exemplary embodiment of the biorefinery of FIG. 1.

FIG. 3 is a process flow diagram of an exemplary embodiment of biorefinery 10 of FIG. 1. The processes are substantially similar to those of FIG. 2 through the production of beer 32. Beer 32 may be directed into a separation process 50, which separates the beer 32 into a liquid component and a solids component. The liquid component from separation process 50 may be processed by distillation processes operating through distillation system 42 to produce ethanol 16.

The solids component may be directed into a wash process 52, which washes the solids component with ethanol 16 from distillation process 46 and/or dehydration/filtration process 48. Biochemicals removed by wash process 52 may be extracted by a biochemical extraction process. Certain components from wash process 52 may be directed into distillation system 42 (e.g., distillation pre-treatment process 44). Ethanol-washed solids from wash process 52 may be directed into separation process 38, where a certain amount of water and ethanol may be removed before the ethanol (e.g., solvent) is removed by desolventizing process 40 to produce meal 18. Liquids removed by separation process 38 and desolventizing process 40 may be directed to wash process 52.

Figure 4:
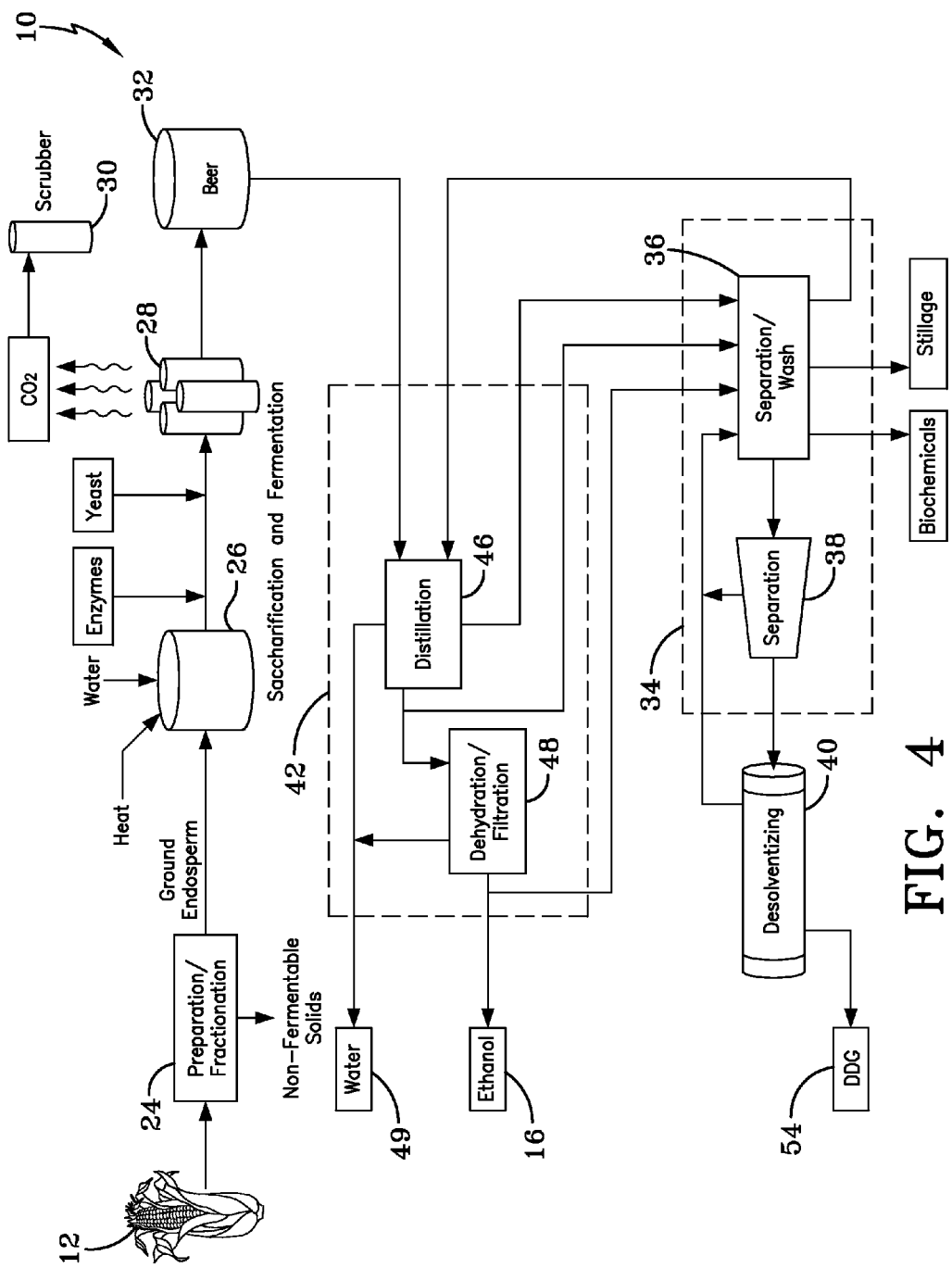
FIG. 4 is a process flow diagram of an exemplary embodiment of the biorefinery of FIG. 1.

FIG. 4 is a process flow diagram of an exemplary embodiment of biorefinery 10 of FIG. 1. The processes are substantially similar to those of FIGS. 2 and 3 through the production of beer 32. Beer 32 may be directed into distillation process 46, with ethanol from distillation process 46 being directed to dehydration/filtration process 48, and the liquid/solids mixture (e.g., stillage) from distillation process 46 being directed into separation/wash process 36. Separation/wash process 36 may receive ethanol from distillation process 46 and/or dehydration/filtration process 48 and wash the liquid/solids mixture (e.g., stillage) from distillation process 46 with the ethanol, increasing the ethanol concentration of the liquid/solids mixture (e.g., stillage). The ethanol-washed liquid/solids mixture (e.g., stillage) may be directed into separation process 38, where a certain amount of water and ethanol may be removed before the ethanol (e.g., solvent) is removed by desolventizing process 40 to produce distillers dried grain (DDG) 54. Liquids removed by separation process 38 and desolventizing process 40 may be re-cycled back through separation/wash process 36. Biochemicals and stillage may be extracted from separation/wash process 36.

Figure 5:
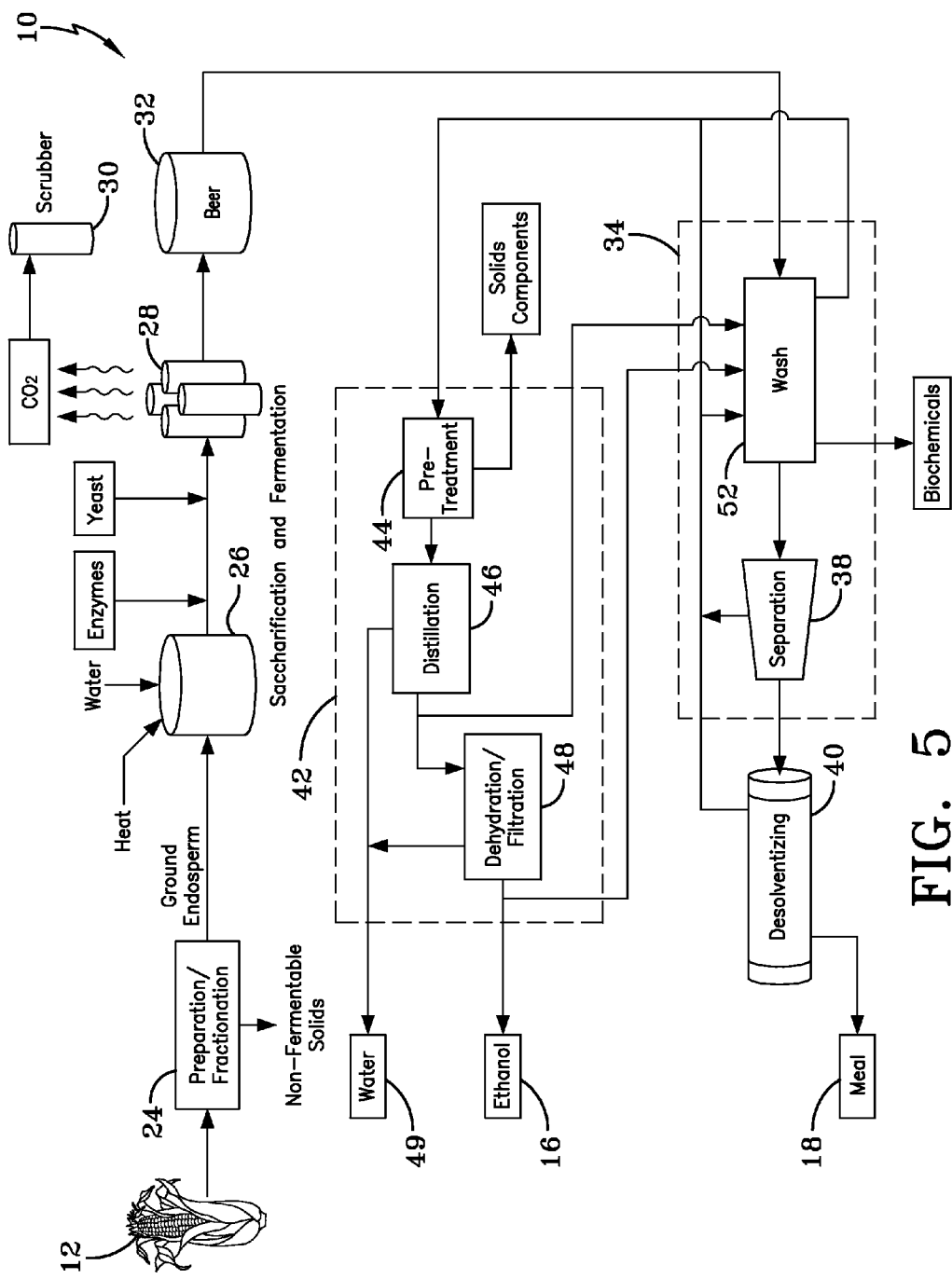
FIG. 5 is a process flow diagram of an exemplary embodiment of the biorefinery of FIG. 1.

FIG. 5 is a process flow diagram of an exemplary embodiment of biorefinery 10 of FIG. 1. The processes are substantially similar to those of FIGS. 2 through 4 through the production of beer 32. Beer 32 may be directed into wash process 52, which may wash beer 32 with ethanol from distillation process 46 and/or dehydration/filtration process 48. The ethanol-washed beer 32 may be directed into separation process 38, where a certain amount of water and ethanol may be removed before the ethanol (e.g., solvent) is removed by desolventizing process 40 to produce meal 18. Liquid removed by separation process 38 and desolventizing process 40 may be re-cycled back through wash process 52. Ethanol and water from wash process 52, separation process 38, and desolventizing process 40 may also be directed into distillation system 42 (e.g., distillation pre-treatment process 44).

Figure 6:
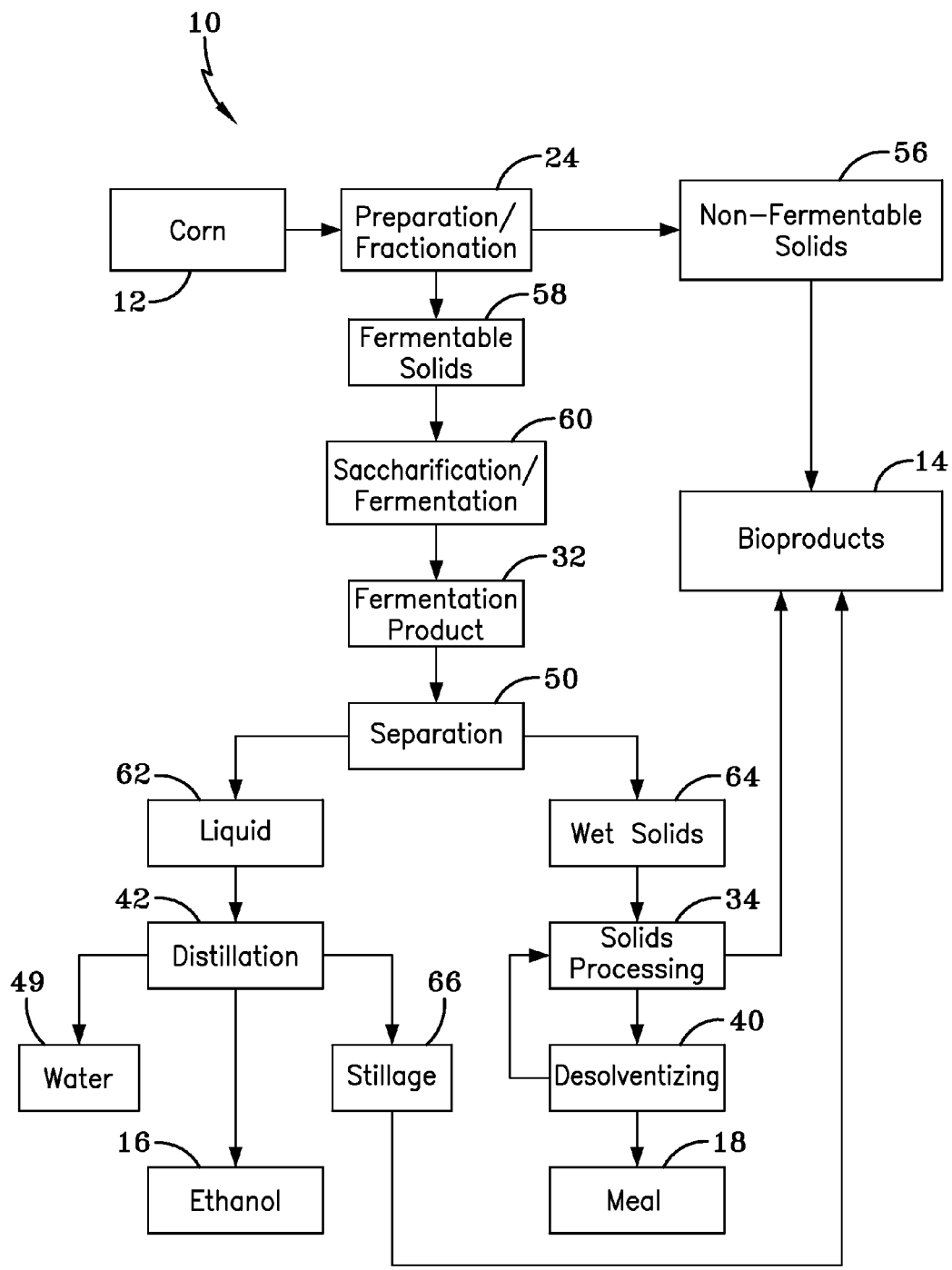
FIG. 6 is a block flow diagram of an exemplary embodiment of the biorefinery.

FIG. 6 is a block flow diagram of an exemplary embodiment of biorefinery 10. Corn 12 may first be directed into preparation/fractionation process 24, where it is prepared for saccharification and fermentation. Non-fermentable solids in corn 12 may be separated (e.g., fractionated) from fermentable solids. Corn kernels generally comprise endosperm, germ, and fiber. Endosperm comprises most of the starches and proteins available in a corn kernel and, therefore, is used in fermentation process 28 to generate ethanol. In other words, endosperm represents the fermentable solids of a corn kernel; germ and fiber represent the non-fermentable solids, which may be withheld from fermentation process 28. Endosperm comprises approximately 80-85% of a corn kernel, germ comprises approximately 10-15% of a corn kernel, and fiber comprises approximately 5-10% of a corn kernel, all by mass.

Non-fermentable solids 56 may be directed into various bioproduct processes, which may produce usable bioproducts 14. Non-fermentable solids 56 may include the germ and fiber of corn 12, which may be processed into bioproducts such as corn oil, corn syrup, bran, flour, and proteins (e.g., zein). Fermentable solids 58 (e.g., endosperm of corn 12) from preparation/fractionation process 24 may be directed into a saccharification/fermentation process 60, which may include saccharification process 26 and fermentation process 28. Saccharification process 26 and fermentation process 28 may be conducted separately (e.g., in separate stages) or may be conducted concurrently (e.g., in an integrated stage). It should be noted that fermentable solids 58 may contain small portions of non-fermentable components (e.g., germ and fiber) not intended for the fermentation process.

Preparation/fractionation process 24 may include passing corn 12 through mills, such as hammer mills and pins mills, to grind fermentable solids 58 into a fine powder (e.g., flour), further facilitating saccharification/fermentation process 60. Fermentable solids 58 (e.g., endosperm) include a high proportion of starches suitable for fermenting to produce ethanol 16. Saccharification/fermentation process 60 may include saccharifying fermentable solids 58 to convert the starches within fermentable solids 58 into sugars. The process of saccharifying fermentable solids 58 may include adding heat, water, and enzymes to fermentable solids 58 to produce a fermentation slurry.

Saccharification/fermentation process 60 may also include adding yeast to the fermentation slurry. The yeast helps convert the sugars within the fermentation slurry into ethanol 16 and carbon dioxide. The fermentation slurry may be agitated and cooled until the concentration of ethanol 16 has been maximized. The output from saccharification/fermentation process 60 may be referred to as fermentation product 32, which may generally include ethanol 16, but may also include a certain amount of water, as well as syrup, particulate matter, and dissolved solids.

Fermentation product may be separated by separation process 50 into a liquid component and a solids component, both of which may be processed in respective processing paths. The liquid component may include liquid 62, which contains ethanol 16, a certain amount of water and other non-ethanol liquids, as well as fine solids, which may be removed from liquid 62. Distillation system 42 may remove most of the water, other non-ethanol liquids, and fine solids to produce ethanol 16. Ethanol 16 leaving distillation system 42 may contain various target concentrations of ethanol, such as from approximately 95% (e.g., 190 proof) to approximately 100% (e.g., 200 proof). Stillage 66 (e.g., comprising liquid and wet solids) from distillation system 42 may be processed and/or combined into bioproducts 14 (e.g., animal feed, oils, syrup, and other biochemicals).

The solids component may include wet solids 64, which may include a certain amount of ethanol, a certain amount of water, syrup, particulate matter, and dissolved solids. It should be noted that when reference is made to "solids," the solids may include particulate matter and dissolved solids, which may be associated with a certain amount of liquids (e.g., "wet solids"). Solids processing system 34 and desolventizing process 40 may remove most of the water and ethanol from wet solids 64 to produce meal 18. Solids processing system 34 may include washing wet solids 64 with ethanol or a liquid with a desired ethanol content to decrease the boiling point, specific heat, and enthalpy (heat) of vaporization of the wet solids 64, reducing the energy required to dry (e.g., desolventize) wet solids 64 to produce meal 18. The ethanol may be directed to solids processing system 34.

Figure 7:
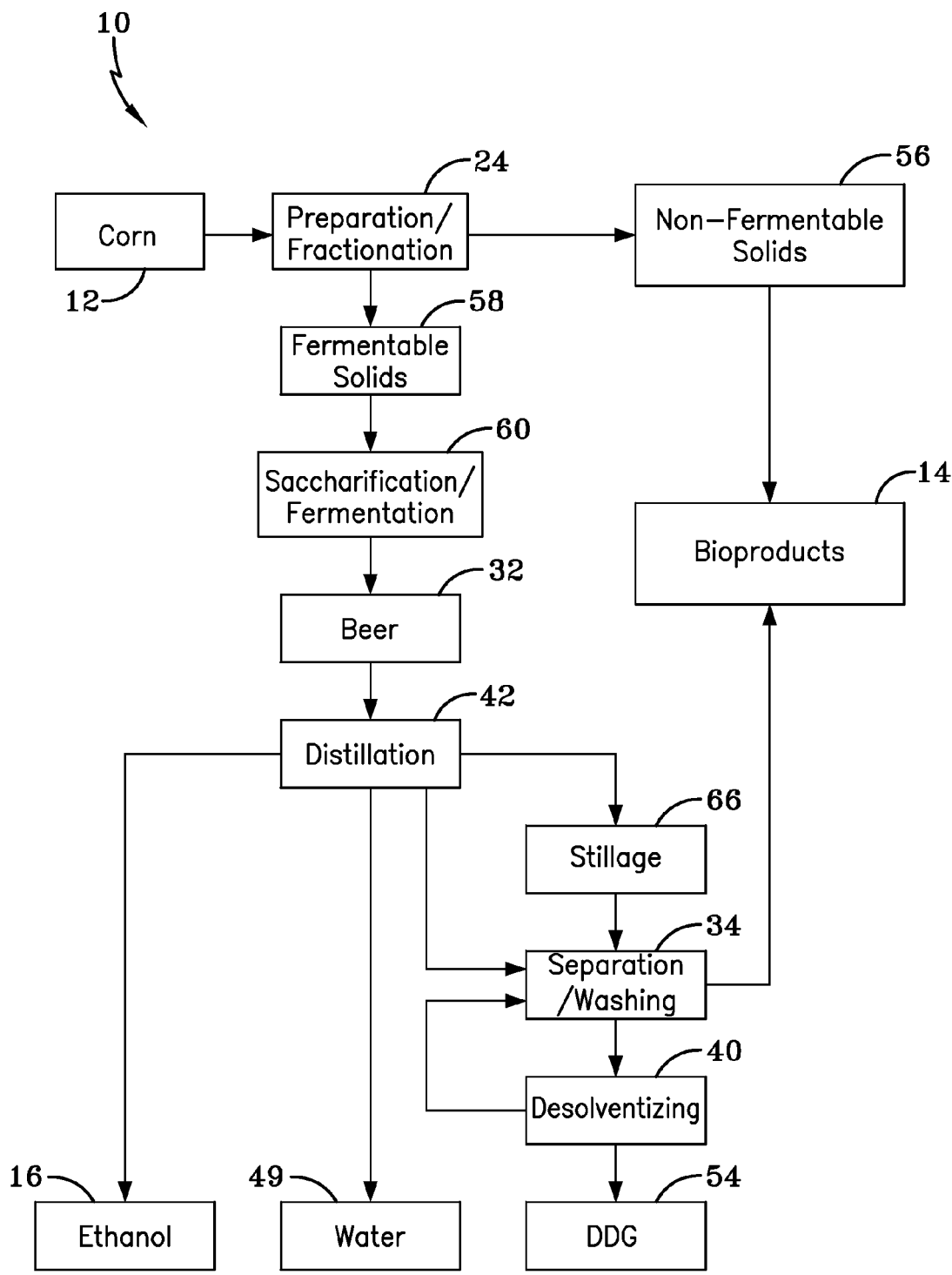
FIG. 7 is a block flow diagram of an exemplary embodiment of the biorefinery.

FIG. 7 is a block flow diagram of an exemplary embodiment of biorefinery 10. The processes are substantially similar to those of FIG. 6 through the production of beer 32. The fermentation product shown as beer 32 may be directed into distillation system 42, where beer 32 is distilled to produce ethanol 16. Stillage 66 from distillation system 42 may be directed into solids processing system 34 (e.g., including separation and washing), where stillage 66 may be washed with ethanol from distillation system 42 and/or desolventizing process 40 to increase the ethanol concentration of stillage 66, reducing the amount of energy required by desolventizing process 40 to remove liquids from stillage 66 to produce DDG 54. Thin stillage may be removed from solids processing system 34 as bioproducts 14.

Figure 8:
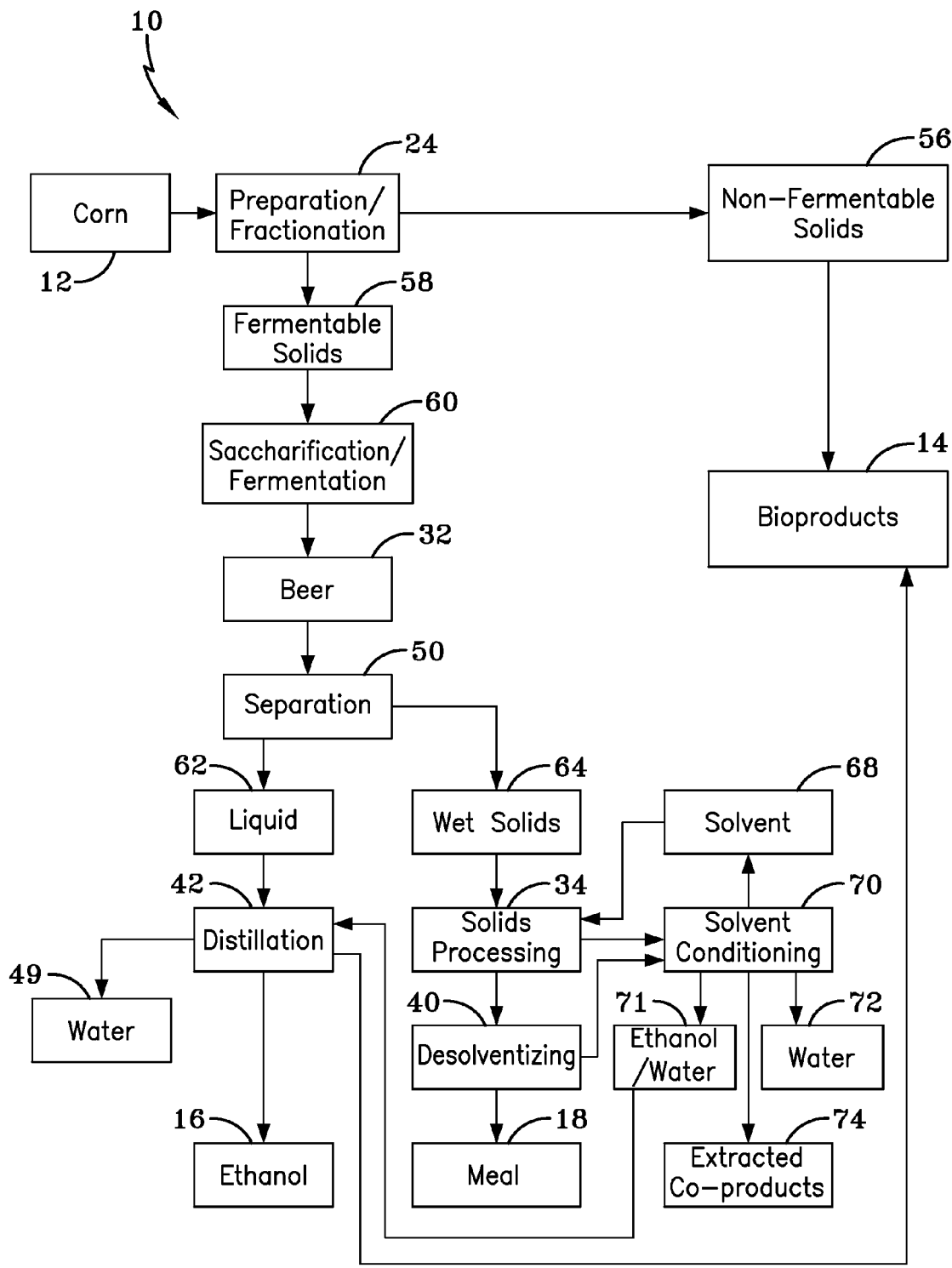
FIG. 8 is a block flow diagram of an exemplary embodiment of the biorefinery.

FIG. 8 is a block flow diagram of an exemplary embodiment of biorefinery 10. The processes are substantially similar to those of FIGS. 6 and 7 through the production of the fermentation product shown as beer 32. Beer 32 may be separated by separation process 50 into a liquid component shown as comprising liquid 62 and a solids component shown as comprising wet solids 64. Ethanol 16 may be recovered from liquid 62 by distillation system 42; wet solids 64 may be directed into solids processing system 34, where solids may be washed with a solvent 68 (e.g., hexane) other than ethanol. Solvent 68 may be received by solids processing system 34 from a solvent conditioning process 70, which may in turn receive spent solvent from solids processing system 34, forming a closed-loop cycle of solvent 68 through solids processing system 34. Solvent from solvent-washed wet solids 64 may be removed by desolventizing process 40 to produce meal 18. Solvent conditioning process 70 may also remove a ethanol/water mixture 71 and direct the ethanol/water mixture 71 to distillation system 42. Solvent conditioning process 70 may further remove water 72 and extracted co-products 74 from wet solids 64.

Figure 9:
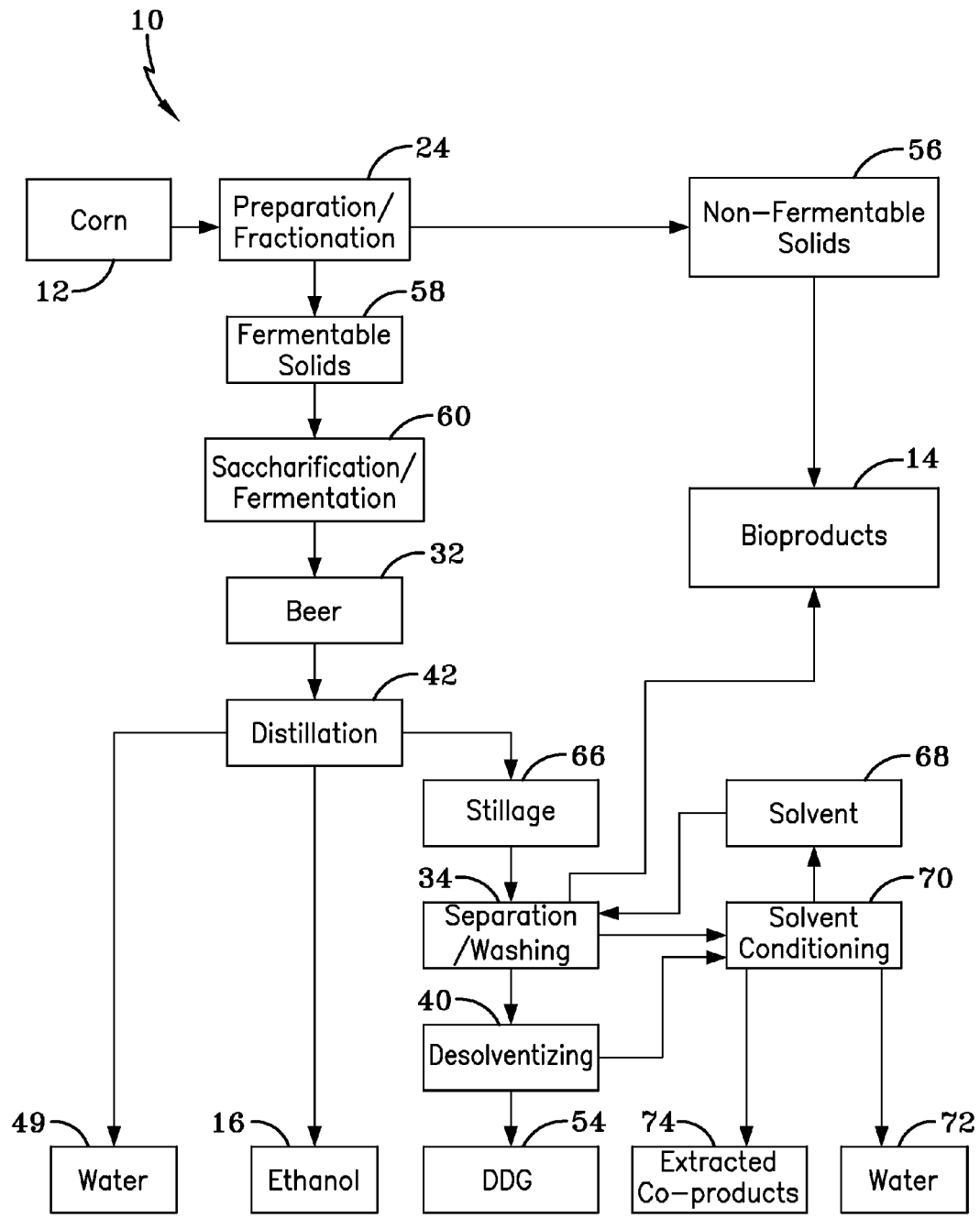
FIG. 9 is a block flow diagram of an exemplary embodiment of the biorefinery.

FIG. 9 is a block flow diagram of an exemplary embodiment of biorefinery 10. The processes are substantially similar to those of FIGS. 6 through 8 through the production of the fermentation product shown as beer 32. Beer 32 may be directed into distillation system 42, where beer 32 is distilled to produce ethanol 16. Stillage 66 from distillation system 42 may be directed into solids processing system 34 (e.g., separation and washing), where stillage 66 may be washed with solvent 68 (e.g., hexane). Solvent 68 may be received by solids processing system 34 from solvent conditioning process 70, which may in turn receive spent solvent from solids processing system 34, forming a closed-loop cycle of solvent 68 through solids processing system 34. Solvent from solvent-washed wet solids 64 may be removed by desolventizing process 40 to produce DDG 54. Solvent conditioning process 70 may further remove water 72 and extracted co-products 74 from stillage 66. Thin stillage may be removed from solids processing system 34 as bioproducts 14.

Figure 10:
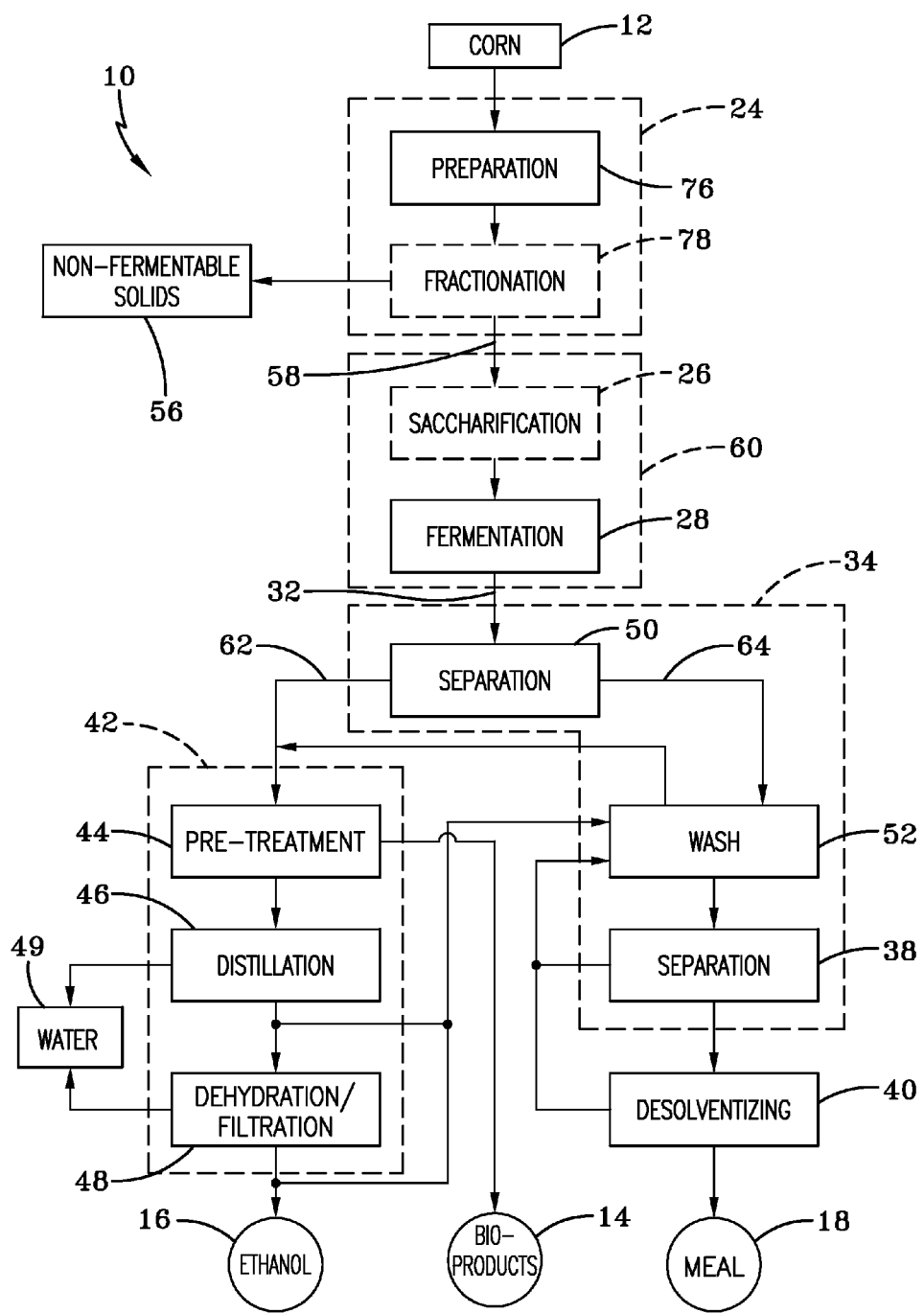
FIG. 10 is a block flow diagram of an exemplary embodiment of the biorefinery.

FIG. 10 is a block flow diagram of an exemplary embodiment of biorefinery 10. Biorefinery 10 begins with preparation/fractionation process 24, which may include a preparation process 76 and/or a fractionation process 78. Preparation/fractionation process 24 prepares corn 12 for saccharification and fermentation in saccharification process 26 and fermentation process 28.

Preparation process 76 may include a cleaning stage to remove impurities that may be present in the corn, such as stalks, cobs, stone, sand, and other fine particles. Clean corn output from the cleaning stage may be directed into a water tempering stage, where corn 12 may be tempered with a water concentration for a period of time. In the water tempering stage, the water penetrates the germ and fiber of corn 12, facilitating subsequent removal of the germ and fiber from corn 12, as well as increasing resistance of the germ and fiber to physical breakage during subsequent stages (e.g., further separation).

Tempered whole corn 12 from preparation process 76 may then be directed into fractionation process 78. Corn 12 may be fractionated into non-fermentable solids 56 (e.g., primarily germ and fiber) and fermentable solids 58 (e.g., primarily endosperm) with fermentable solids 58 being milled to reduce the particle size of fermentable solids 58. The downstream processes of biorefinery 10 may not require that corn 12 be fractionated into endosperm, germ, and fiber. For example, separation process 50 and solids processing system 34 do not require fractionated corn 12 to lead to beneficial results, although such fractionation may enhance the benefits.

The ground endosperm from fractionation process 78 may be directed into saccharification process 26, in which starch within the endosperm may be converted into sugars that can be fermented by a microorganism, such as yeast. The conversion may be accomplished by saccharifying the endosperm with a number of additional inputs, such as saccharifying enzyme compositions, without cooking the endosperm. The downstream processes of biorefinery 10 may not require that corn 12 be saccharified prior to fermentation process 28, although certain benefits and co-products may be enhanced by saccharification process 26.

The output of saccharification process 26 may be described as a fermentation slurry, which may be directed into fermentation process 28, in which sugars within the fermentation slurry are fermented to produce ethanol 16. Additional inputs (e.g., microorganisms such as yeast) may be introduced into fermentation process 28 to facilitate the fermenting. The output of fermentation process 28 may include fermentation product 32, such as a mixture of ethanol, water, syrup, particulate matter (e.g., fiber, germ, yeast, etc.), and dissolved solids.

Fermentation product 32 from fermentation process 28 may be directed into separation process 50, in which fermentation product 32 is separated into a liquid component (e.g., liquid 62) and a solids component (e.g., wet solids 64). The equipment used for separation process 50 may vary and may include, for example, centrifuges, decanters, hydroclones, sedimentation tanks, and filter presses.

Liquid 62 (e.g., water/ethanol mixture) and wet solids 64 (e.g., wet solids) may then be directed into separate processing paths. Liquid 62 may be directed into distillation system 42; wet solids 64 may be processed through solids processing system 34. An end product of the liquids processing path is ethanol 16; an end product of the solids processing path is meal 18 (and possibly other bioproducts such as biochemicals).

Liquid 62 (e.g., water/ethanol mixture) from separation process 50 may first be directed into distillation pre-treatment process 44, in which liquid 62 is prepared for further distillation. Distillation pre-treatment process 44 may include heating liquid 62 prior to distillation. Distillation pre-treatment process 44 may also include removing the remaining fractions of germ and fiber from liquid 62 as bioproducts 14. Once liquid 62 has been pre-treated by distillation pre-treatment process 44, the pre-treated liquid 62 may be directed into distillation process 46, in which water may be removed from ethanol 16. Ethanol 16 from distillation process 46 may be approximately 190 proof (e.g., approximately 95% alcohol). Ethanol 16 from distillation process 46 may then be directed into dehydration/filtration process 48, in which ethanol 16 is further dried and filtered. Ethanol 16 from dehydration/filtration process 48 may be approximately 200 proof (e.g., approximately 100% alcohol). Ethanol 16 from dehydration/filtration process 48 may be sold for use as a fuel.

Wet solids 64 from separation process 50 may first be directed into a wash process 52, in which wet solids 64 are washed with various concentrations of ethanol 16 to increase the ethanol concentration of wet solids 64. The wet solids 64 may then be directed into separation process 38 and desolventizing process 40, in which the wet solids 64 may be deliquified, separated, and desolventized to generate meal 18. By increasing the ethanol concentration of wet solids 64 in wash process 52, the boiling point of the liquid component of the wet solids will be decreased, as will its specific heat and enthalpy (heat) of vaporization, reducing the energy required to dry (e.g., desolventize) the wet solids in desolventizing process 40. Wash process 52 and separation process 38 may be integrated or separate, such that each stage through wash process 52 and separation process 38 progressively increases the ethanol content in the wet solids. Ethanol 16 from separation process 38 and desolventizing process 40 may be used to increase the ethanol concentration of wet solids 64 in wash process 52.

Figure 11:
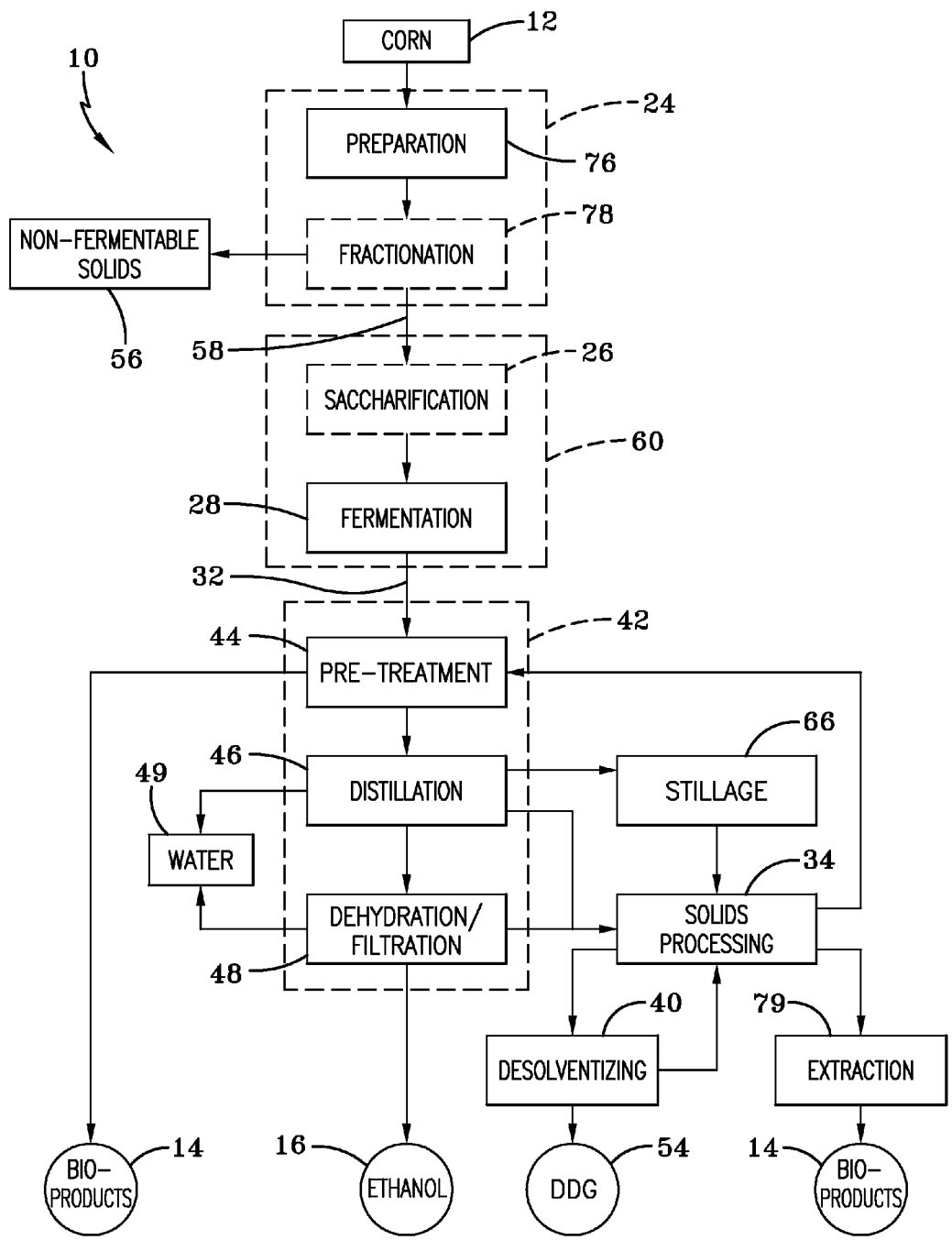
FIG. 11 is a block flow diagram of an exemplary embodiment of the biorefinery.

FIG. 11 is a block flow diagram of an exemplary embodiment of biorefinery 10. The processes are substantially similar to those of FIG. 10 through fermentation process 28. Fermentation product 32 from fermentation process 28 may be directed into distillation system 42 (e.g., distillation pre-treatment process 44, distillation process 46, and dehydration/filtration process 48), where fermentation product 32 is distilled to produce ethanol 16. Stillage 66 from distillation process 46 may be directed into solids processing system 34, where stillage 66 may be washed with ethanol to increase the ethanol concentration of stillage 66, reducing the amount of energy required by desolventizing process 40 to remove liquids from stillage 66 to produce DDG 54. Solids processing system 34 may receive the ethanol from distillation process 46 and/or dehydration/filtration process 48. A certain amount of ethanol from desolventizing process 40 may be directed back to solids processing system 34 for further use. An extraction process 79 may also extract bioproducts 14 from solids processing system 34. Some biochemicals may be extracted from solids processing system 34 and directed into distillation pre-treatment process 44 for further processing.

Figure 12:
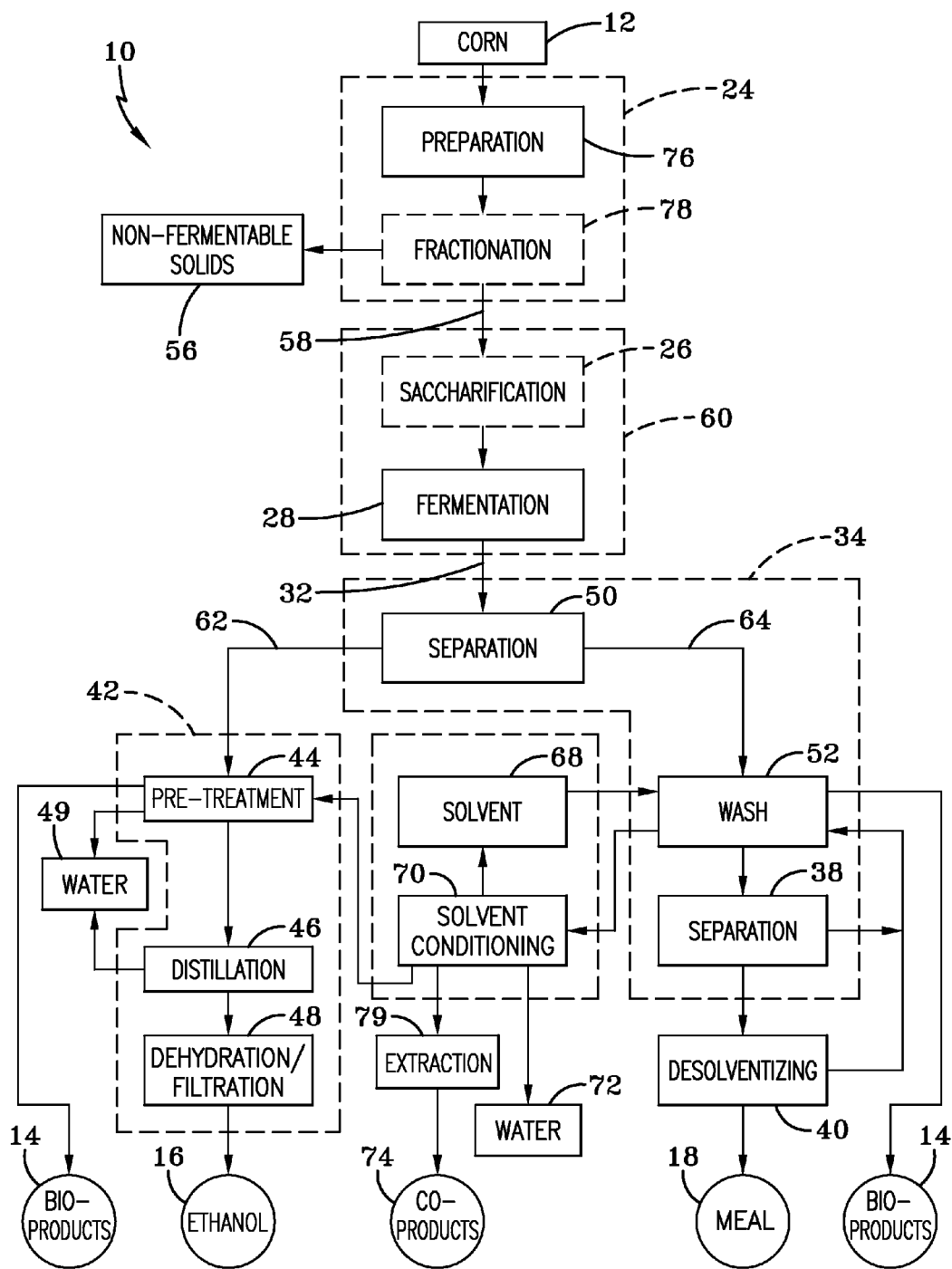
FIG. 12 is a block flow diagram of an exemplary embodiment of the biorefinery.

FIG. 12 is a block flow diagram of an exemplary embodiment of biorefinery 10. The processes are substantially similar to those of FIGS. 10 and 11 through fermentation process 28. Fermentation product 32 from fermentation process 28 may be separated by separation process 50 into a liquid component shown as comprising liquid 62 and a solids component shown as comprising wet solids 64. Liquid 62 may be converted into ethanol 16 by distillation system 42 (e.g., distillation pre-treatment process 44, distillation process 46, and dehydration/filtration process 48); wet solids 64 may be directed into wash process 52, where solids may be washed with a solvent 68 (e.g., hexane) other than ethanol. Solvent 68 may be received by wash process 52 from solvent conditioning process 70, which may in turn receive spent solvent from wash process 52, forming a closed-loop cycle of solvent 68 through wash process 52. Solvent from solvent-washed wet solids 64 may be removed by separation process 38 and desolventizing process 40 to produce meal 18. Some of the solvent removed from separation process 38 and desolventizing process 40 may be directed to wash process 52 for further use. Solvent conditioning process 70 may also remove an ethanol/water mixture 71 and direct the ethanol/water mixture 71 to distillation system 42 (e.g., distillation pre-treatment process 44). Solvent conditioning process 70 may further remove water 72; extraction process 79 may extract co-products 74. Both pre-treatment process 44 and wash process 52 may facilitate the recovery of bioproducts 14 available from the fermentation product 32.

The individual processes of biorefinery 10 may be highly synergistic, with each process contributing to efficiencies and other benefits of other processes. For example, by fractionating and milling the feedstock into primarily ground endosperm in fractionation process 78, the downstream processes of biorefinery 10 may be indirectly enhanced. Because primarily fermentable endosperm is directed into saccharification process 26, only enough energy to saccharify the endosperm will be required by saccharification process 26. Energy need not be expended processing the non-fermentable solids (e.g., germ and fiber) in saccharification process 26 or in other processes, such as the operation of distillation system 42. Because the fermentation slurry from saccharification process 26 consists of primarily fermentable solids, water, and enzymes, fermentation process 28 may also be generally more efficient.

By saccharifying the ground endosperm in saccharification process 26 without cooking, the amount of heat input into the ground endosperm may be lower as compared to conventional cooking processes. Saccharifying the ground endosperm without "cooking" (e.g., using "raw starch" hydrolysis) may lead to meal 18 having a different quality than DDG 54 produced by conventional biorefineries. For example, meal 18 may be higher in protein values, as well as higher in amino acids (e.g., lysine) and other biochemicals having different attributes and qualities, than typical DDG 54.

Separating a liquid component comprising liquid 62 from a solids component comprising wet solids 64 in separation process 50 may lead to several benefits downstream of separation process 50. Because wet solids 64 (e.g., a certain amount of ethanol, a certain amount of water, syrup, particulate matter, and dissolved solids) have been substantially removed from liquid 62 (e.g., a water/ethanol mixture), the distillation equipment of distillation process 46 will be much less likely to encounter fouling from wet solids 64, which may otherwise impair the performance of the distillation equipment, render it less efficient, and/or require cleaning. The distillation equipment of distillation process 46 may also be sized smaller because the added mass of wet solids 64 need not be processed through the distillation equipment. The removal of wet solids 64 may also lead to the distillation equipment of distillation process 46 requiring less energy than conventional distillation equipment.

The combination of the processes of biorefinery 10 may lead to overall energy reduction of biorefinery 10, as well as reducing the temperature to which the products of biorefinery 10 are exposed. Wet solids 64, stillage 66, meal 18, and DDG 54 may all be processed by biorefinery 10 without ever experiencing temperatures above approximately 150° C. Maintaining the temperature below 150° C. has been shown to reduce the possibility of degradation of the resulting meal 18 or DDG 54. Reduced degradation may include color transformation and significant oxidation of residual starches downstream of fermentation process 28. Using measurements of the resulting meal 18 or DDG 54, such as neutral detergent fiber (NDF) measurements, it has been found that maintaining the temperatures experienced by meal 18 or DDG 54 within biorefinery 10 under approximately 150° C. significantly reduces the possibility of degrading the resultant meal 18 or DDG 54. Using these same measurements, it has been found that maintaining the temperatures experienced by meal 18 or DDG 54 within biorefinery 10 under approximately 100° C. may further reduce the possibility of degrading the meal 18 or DDG 54.

Figure 13:
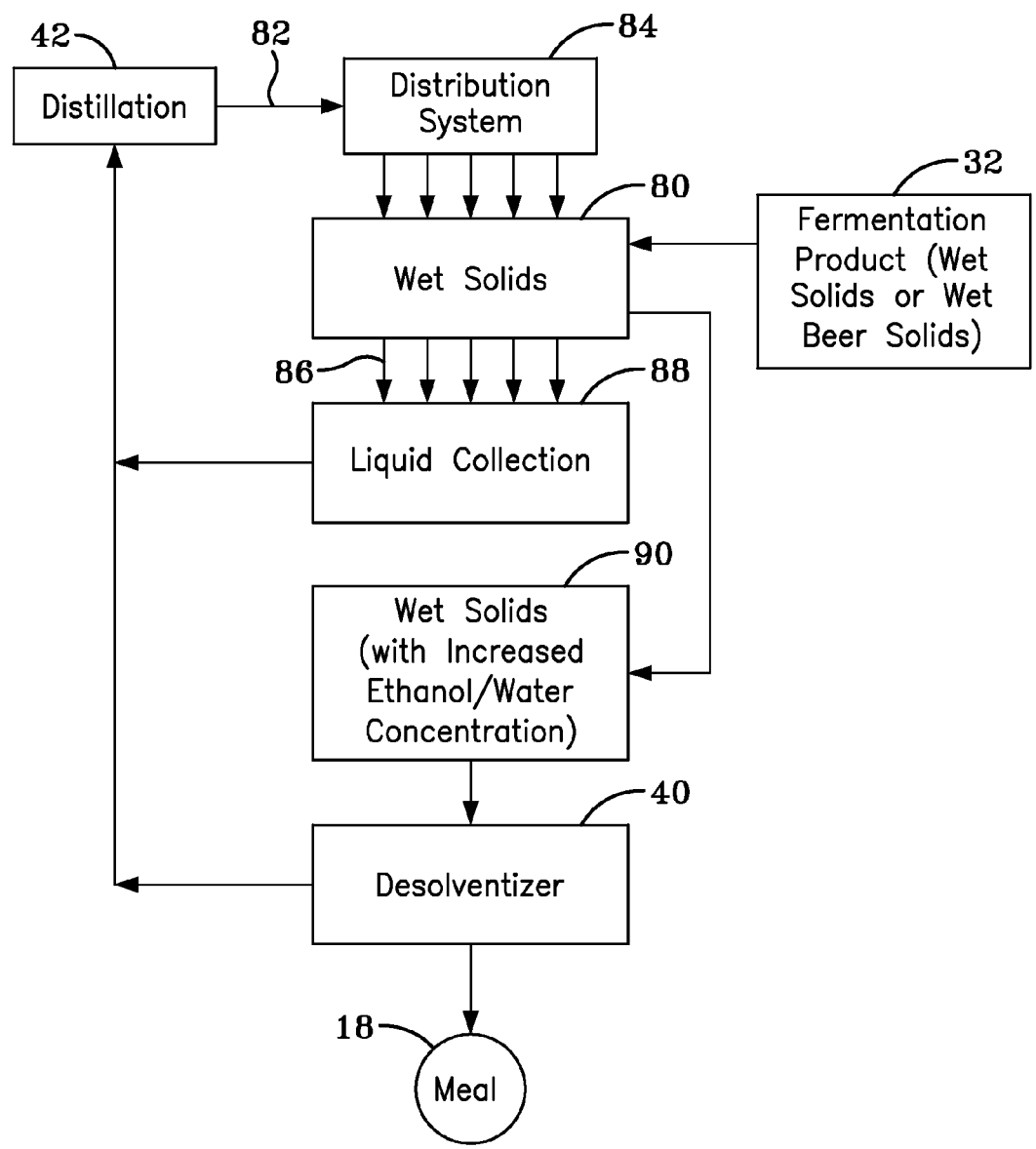
FIG. 13 is a block flow diagram of an exemplary embodiment of solids washing processes.
Figure 14:
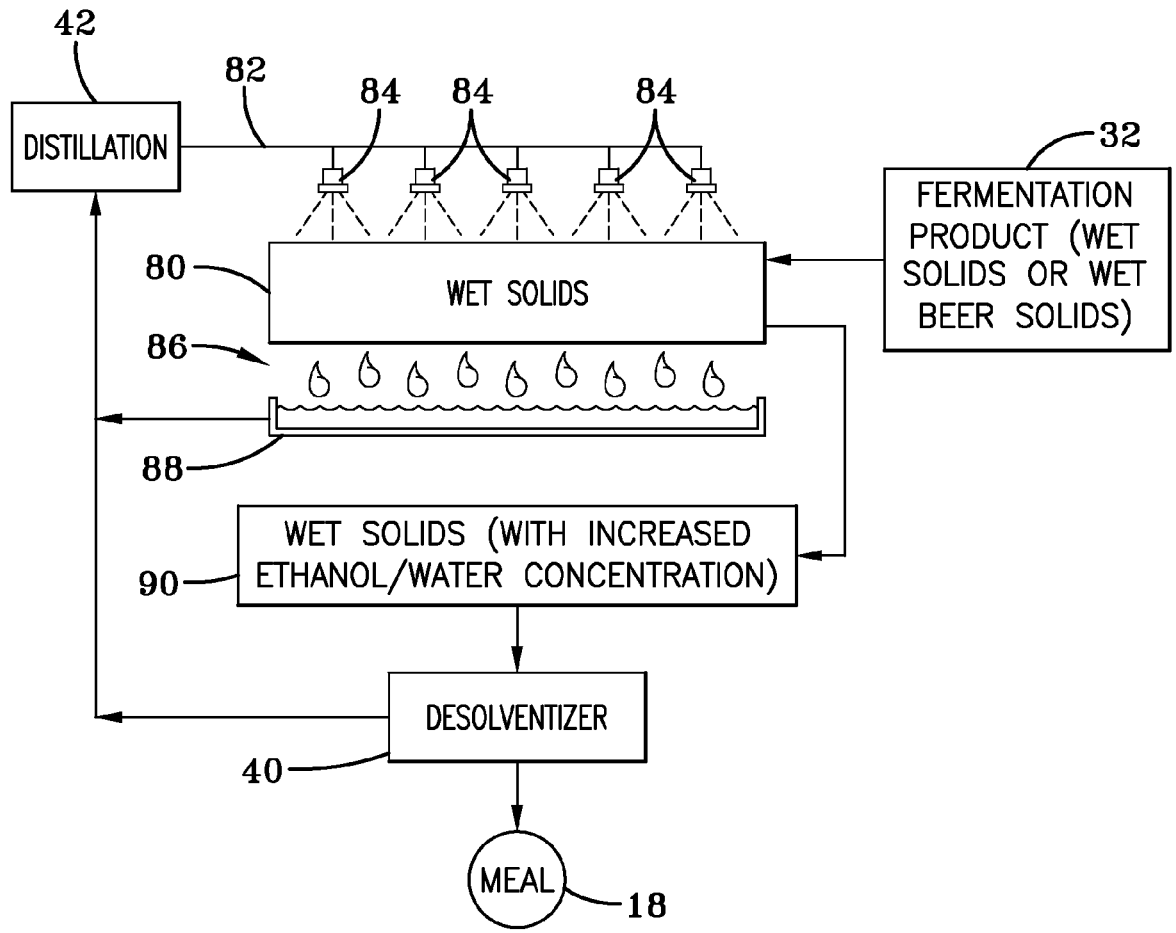
FIG. 14 is a process flow diagram of an exemplary embodiment of the solids washing processes.

FIGS. 13 and 14 are a block flow diagram and a process flow diagram of an exemplary embodiment of solids processing system 34. Wet solids components 80 (e.g., wet solids 64 or stillage 66) may be washed with ethanol 16 to increase the ethanol concentration, facilitating the reduction of energy required for drying. Wet solids components 80 may generally comprise wet solids or wet beer solids. Washing with ethanol may lead to lower drying energy consumption regardless of whether a liquid component (e.g., liquid 62) and a solids component (e.g., wet solids 64) have been separated by separation process 50. The ethanol wash may also be used with wet solids exiting a distillation process, as in existing plants.

A stream of ethanol 16 may be introduced into wet solids components 80. The stream of ethanol 16 may be received from distillation system 42 or may be received from other sources internal or external to biorefinery 10. The stream of ethanol 16 may be fed through ethanol feed flow lines 82 into an ethanol distribution system 84, which applies (e.g., sprays, mists, drips, deposits, or pours over) ethanol 16 to wet solids components 80 to increase the ethanol concentration of wet solids components 80. Although ethanol distribution system 84 is illustrated as a series of spray nozzles, other means of applying ethanol 16 may be used. For example, ethanol 16 may be poured over wet solids components 80. Wet solids components 80 will remain generally unperturbed by the application of ethanol 16. Once wet solids components 80 have been washed with ethanol 16, liquid 86 (e.g., a mixture of water and ethanol) from wet solids components 80 may be collected by a liquid collection 88, such as a tank or collection tray. Co-products (e.g., zein and xanthophylls) may be extracted from liquid 86, and liquid 86 collected by liquid collection 88 may be directed into distillation system 42 for further processing.

Wet solids components 80 washed with ethanol 16 may be transformed into wet solids components 90, which contain an increased concentration of ethanol 16 to water as compared to the initial wet solids components 80. Less energy may be required by a desolventizer 40 to dry (i.e., desolventize) wet solids components 90 (e.g., after ethanol washing) than would be required by desolventizer 40 to dry (i.e., desolventize) wet solids components 80 (e.g., before ethanol washing). The reduction in energy required to desolventize/dry wet solids components 90 to produce meal 18 may be due at least in part to the fact that wet solids components 90 contain an increased concentration of ethanol 16 to water as compared to wet solids components 80.

Figure 15:
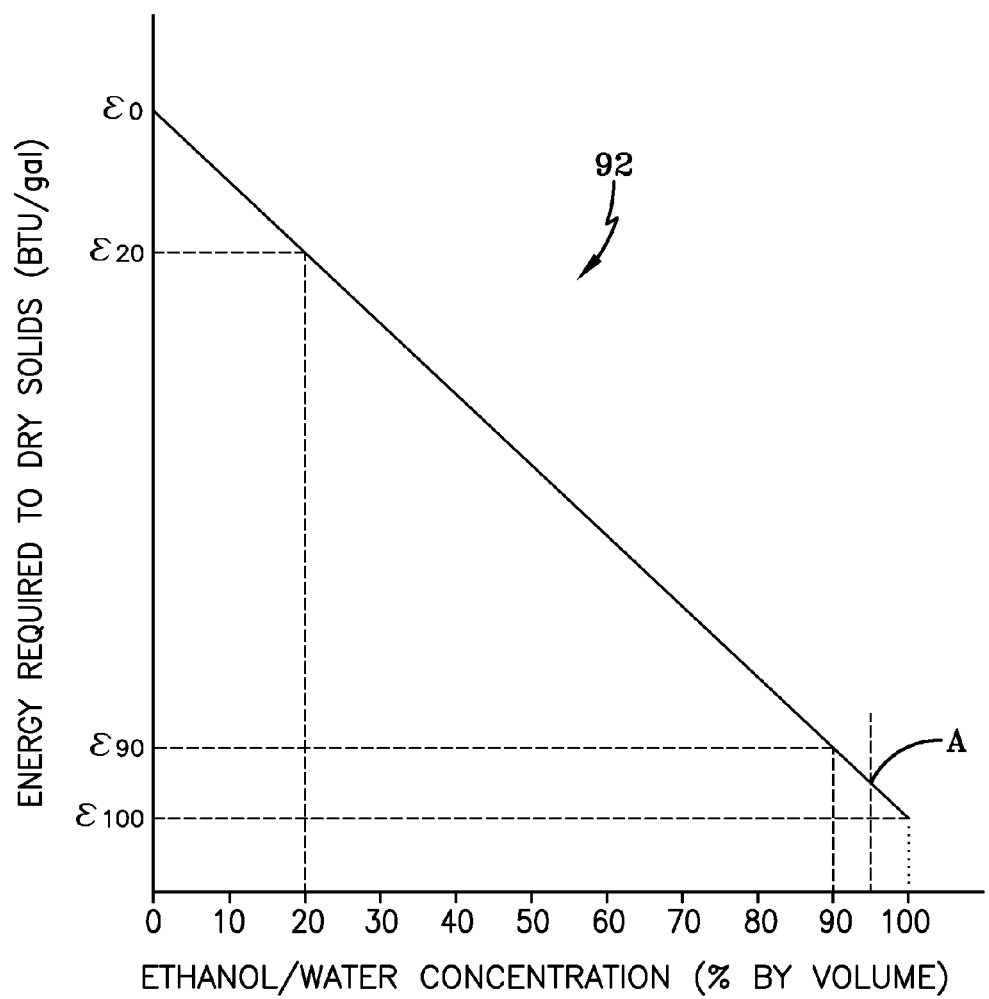
FIG. 15 is an exemplary graphical representation of energy for drying wet solids vs. the ethanol concentration of the wet solids.

FIG. 15 is an exemplary graphical representation 92 of energy for drying wet solids as it relates to the amount of ethanol present in the liquid portion of those wet solids. The horizontal axis in FIG. 15 represents the volume of ethanol present in the liquid portion of the wet solids as a percent of the total liquid volume portion of the wet solids. The vertical axis in FIG. 15 represents the amount of energy that it would take to dry (e.g., by vaporization) all liquid from wet solids. The graphical representation in FIG. 15 represents the relationship of the amount of energy to dry the solids within the liquid portion as the concentration of ethanol changes in the liquid portion of the wet solids. In a conventional drying process, the wet solids may contain no ethanol and may require $\epsilon_0$ amount of energy to remove the liquid from wet solids. By processing the wet solids to contain 20% by volume of ethanol, the amount of energy required to remove the liquid from wet solids would decrease to $\epsilon_{20}$ as depicted in FIG. 15. This trend continues as the ethanol concentration is increased, as seen when the ethanol concentration is increased to 90% by volume and the new amount of energy required to remove the liquid portion is drastically reduced to $\epsilon_{90}$. The lowest amount of energy required to remove the liquid from wet solids can be achieved when the liquid is 100% ethanol.

Returning to FIGS. 13 and 14, increasing the ethanol concentration of wet solids components 90 decreases the amount of energy required to dry wet solids components 90 at least partially because water has a relatively high boiling point, heat capacity, and enthalpy (heat) of vaporization as compared to ethanol. A relatively high amount of energy is required to heat water to a temperature sufficient to vaporize the water; a relatively low amount of energy is required to heat ethanol to a temperature sufficient to vaporize ethanol. For example, the boiling point of ethanol is approximately 173° F. at atmospheric pressure; the boiling point of water is approximately 212° F. at atmospheric pressure. The heat capacity of ethanol is approximately 0.58 BTU/lb-° F.; the heat capacity of water is 1.0 BTU/lb-° F. The enthalpy (heat) of vaporization of ethanol is approximately 362 BTU/lb; the enthalpy (heat) of vaporization of water is approximately 980 BTU/lb. Ethanol may be heated with less energy input, reaching its boiling point at a lower temperature, and once at the boiling point, vaporizes with less energy input.

Figure 16:
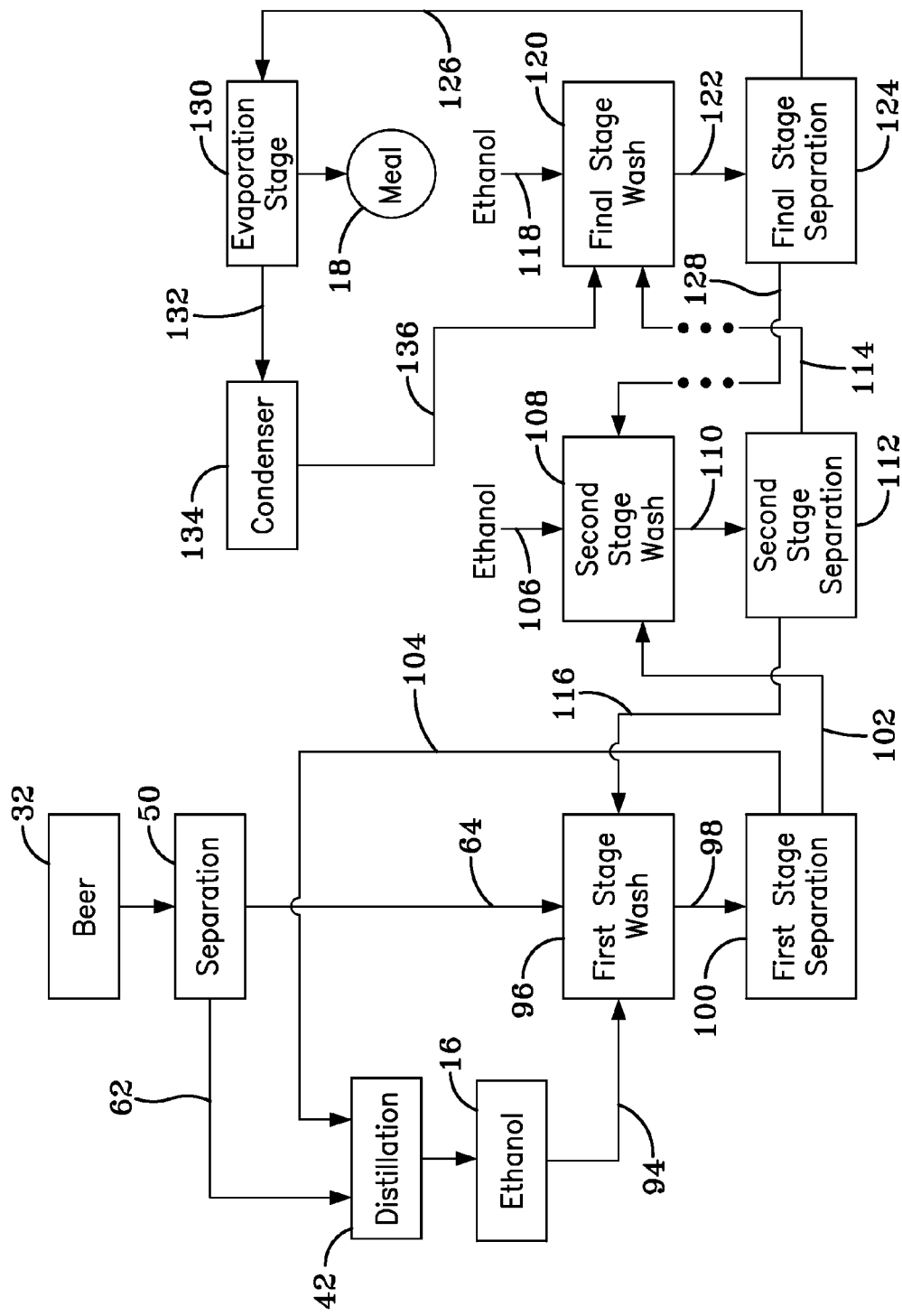
FIG. 16 is a block flow diagram of an exemplary embodiment of the solids washing processes.
Figure 17:
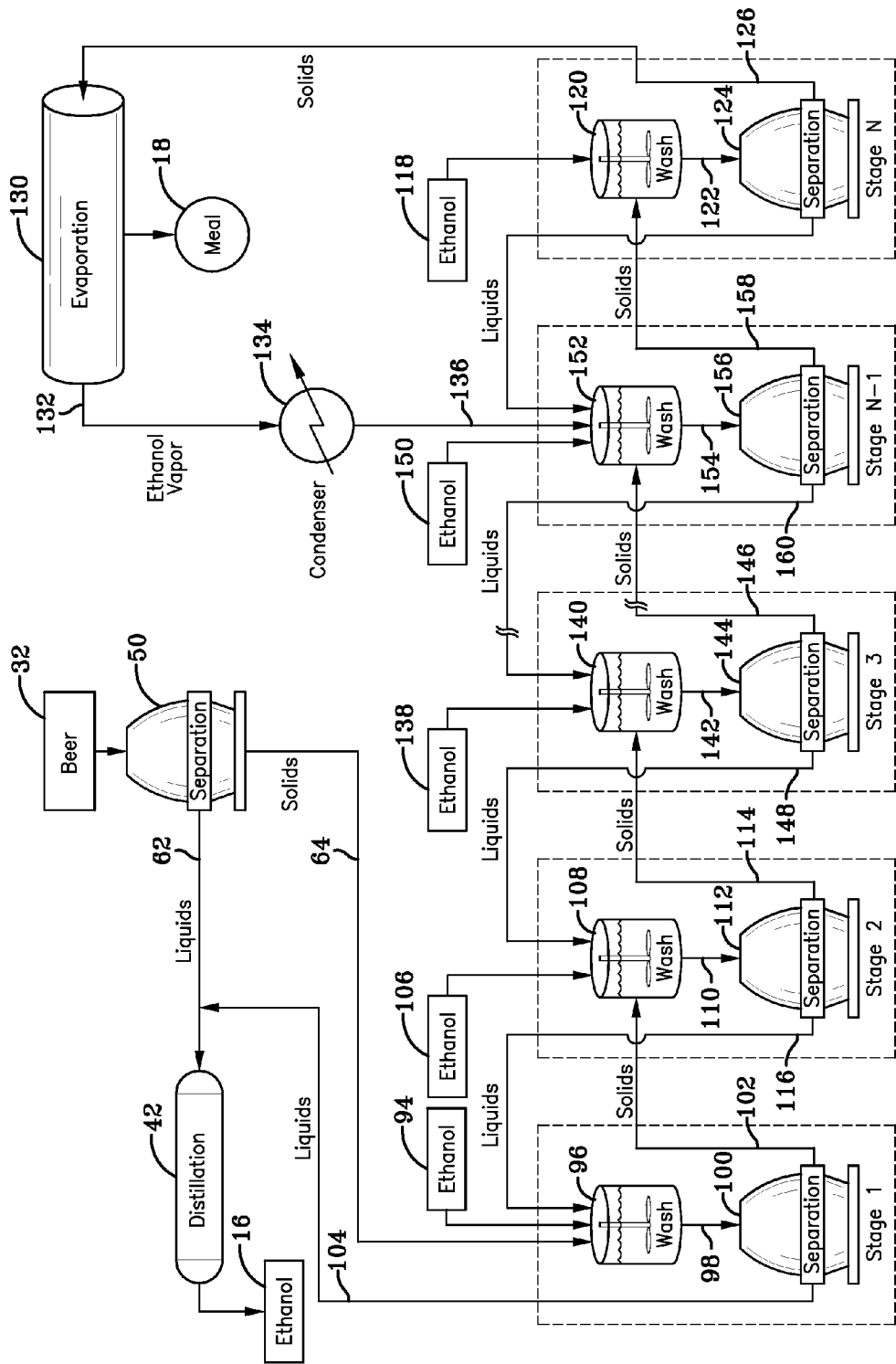
FIG. 17 is a process flow diagram of an exemplary embodiment of the solids washing processes.

Increasing the ethanol concentration of wet solids components 90 helps to decrease the amount of energy required by desolventizer 40 to dry/desolventize wet solids components 90. FIGS. 13 and 14 include one stage of ethanol washing. FIGS. 16 and 17 are a block flow diagram and a process flow diagram of exemplary embodiments of solids processing system 34, comprising multiple ethanol wash stages. Separation process 50 may separate a liquid component shown as liquid 62 (e.g., a water/ethanol mixture) from a solids component shown as wet solids 64 (e.g., a certain amount of ethanol, a certain amount of water, syrup, particulate matter, and dissolved solids). Liquid 62 may be directed into distillation process 46, which may produce ethanol 16.

Ethanol 94 from distillation system 42 may be directed into a first stage wash 96, which also receives wet solids 64 from separation process 50. Wet solids 64 from separation process 50 are washed with ethanol 94 to increase the ethanol concentration of wet solids 64. It should be noted that when reference is made to "ethanol" in the discussions of the wash process, the fluid used may, and in many cases will, be an ethanol-containing fluid, such as a mixture of water and ethanol. Any other suitable solvent (e.g., hexane) may also be used. The "wash" fluid will generally have a higher concentration of ethanol (or other solvent) than the wet solids receiving the wash, displacing water in the wet solids with ethanol (or other solvent).

First stage wash 96 is configured to mix wet solids 64 with ethanol 94. Ethanol-washed solids 98 from first stage wash 96 may be directed into a first stage separation 100, which separates first stage solids 102 from first stage liquid 104. First stage liquid 104 may consist of a water/ethanol mixture, which may be directed back to distillation system 42 for further processing. First stage liquid 104 washes away a certain amount of the water from wet solids 64. First stage solids 102 output from first stage separation 100 will have a higher ethanol concentration than wet solids 64 input into first stage wash 96.

A second stream of ethanol 106 may be directed into a second stage wash 108, which also receives first stage solids 102 from first stage separation 100. First stage solids 102 from first stage separation 100 may be washed with ethanol 106 to further increase the ethanol concentration of first stage solids 102. Second stage wash 108 may be configured to mix first stage solids 102 with ethanol 106. Ethanol 106 may be received from distillation system 42 or may be received from other processes within biorefinery 10.

Ethanol-washed solids 110 from second stage wash 108 may be directed into a second stage separation 112, which may separate second stage solids 114 from second stage liquid 116. Second stage liquid 116 may consist of a water/ethanol mixture, which may be directed back to first stage wash 96. Second stage liquid 116 may supplement or replace ethanol 94 from distillation system 42 to wash wet solids 64 in first stage wash 96. Second stage liquid 116 washes away a certain amount of the water from first stage solids 102. Second stage solids 114 output from second stage separation 112 will have a higher ethanol concentration than first stage solids 102 input into second stage wash 108.

The ethanol wash cycles (e.g., washing and separating) may be repeated multiple times. A last stream of ethanol 118 may be directed into a final stage wash 120, which also receives the previous stage solids from a previous stage separator. The previous stage solids may be washed with ethanol 118 to further increase the ethanol concentration of the previous stage solids. Final stage wash 120 may be configured to mix the previous stage solids with ethanol 118. Ethanol 118 may be received from distillation system 42 or may be received from other processes within biorefinery 10.

Ethanol-washed solids 122 from final stage wash 120 may be directed into a final stage separation 124, which may separate final stage solids 126 from final stage liquid 128. Final stage liquid 128 will consist of a water/ethanol mixture, which may be directed back to the previous stage wash. Final stage liquid 128 may wash away a certain amount of the water from the previous stage solids. Final stage solids 126 output from final stage separation 124 will have a higher ethanol concentration than the previous stage solids input into final stage wash 120.

Final stage solids 126 may then be directed into an evaporation stage 130, in which the remaining liquid may be evaporated from final stage solids 126, leaving dry or substantially dry meal 18. Ethanol vapor 132 recovered from evaporation stage 130 may be condensed by a condenser 134 and added to the final stage ethanol 118 in the final stage ethanol wash cycle, as shown by line 136. In order to effect the condensation of ethanol vapor 132 from evaporation stage 130, a heat exchanger may be used to recover waste heat from any available source, and direct the heat into evaporation stage 130.

FIG. 17 is substantially similar to FIG. 16 with additional wash stages illustrated. A third stream of ethanol 138 may be directed into a third stage wash 140, which also receives second stage solids 114 from second stage separation 112. Second stage solids 114 from second stage separation 112 may be washed with ethanol 138 to further increase the ethanol concentration of second stage solids 114. Third stage wash 140 may be configured to mix second stage solids 114 with ethanol 138. Ethanol 138 may be received from distillation system 42 or may be received from other processes within biorefinery 10.

Ethanol-washed solids 142 from third stage wash 140 may be directed into a third stage separation 144, which may separate third stage solids 146 from third stage liquid 148. Third stage liquid 148 may consist of a water/ethanol mixture, which may be directed back to second stage wash 108. Third stage liquid 148 may supplement or replace ethanol 106 from distillation system 42 to wash first stage solids 102 in second stage wash 108. Third stage liquid 148 washes away a certain amount of the water from second stage solids 114. Third stage solids 146 output from third stage separation 144 will have a higher ethanol concentration than second stage solids 114 input into third stage wash 140.

This process continues with a fourth stream of ethanol 150 being used by a next-to-final stage wash 152 to generate ethanol-washed solids 154, which may be separated by a next-to-final stage separation 156. Similar to the other wash stages, solids 158 from next-to-final stage separation 156 may be directed into final stage wash 120; liquid from next-to-final stage separation 156 may be directed to the previous wash stage.

The ethanol wash stages of FIGS. 16 and 17 may be repeated multiple times such that the wet solids contain a low concentration of water and a high concentration of ethanol. The number of ethanol wash stages may be chosen to achieve a particular concentration of ethanol in the resultant wet solids prior to drying. The concentration of the resultant wet solids prior to drying may be selectively adjusted. In each ethanol wash stage, the washes receive a quantity of ethanol wash containing a higher ethanol concentration than the concentration present in the wet solids. For each ethanol wash stage, a water/ethanol mixture may be received from a subsequent ethanol wash stage as an ethanol wash source. The water/ethanol mixture from a subsequent ethanol wash stage may be suitable for a previous ethanol wash stage because the water/ethanol mixture from the subsequent ethanol wash stage may generally contain more ethanol than the wet solids of the previous ethanol wash stage. Using ethanol from a subsequent ethanol wash stage allows the same stream of ethanol 94 brought into the initial ethanol wash stage to be used over and over again until the final ethanol wash stage. If enough ethanol wash stages are used, the composition of the resulting wet solids will have an ethanol concentration approximately equal to the ethanol concentration of ethanol used in the initial ethanol wash stage. After the multiple ethanol wash stages, the resultant final stage solids 126 contain a liquid component with a higher concentration of ethanol than wet solids 64 from separation process 50. In certain embodiments, ethanol stream 118 may be the only stream of ethanol used; ethanol streams 94, 106, 138, and 150 may be used as make-up ethanol, to selectively control the concentration of ethanol in the other wash stages, or may be omitted.

Returning to FIG. 15, to minimize the energy to dry meal 18, the ethanol concentration of the resultant final stage solids 126 may be at or above the azeotropic ratio for water and ethanol (e.g., point A), which is approximately 96% ethanol-to-water. At concentration levels at or above the azeotropic ratio, ethanol in wet solids will vaporize at substantially the same rate as the remaining water in the wet solids, leaving meal 18 while using the least amount of energy for drying. With a ratio of ethanol-to-water below the azeotropic ratio, drying of wet solids will be less efficient than when the ratio is at or above the azeotropic ratio. The process may bring the ethanol content of the wet solids to any point along the concentration line with consequent benefits to drying. In an effort to achieve certain benefits, the wet solids will be brought to an ethanol concentration above the azeotropic ratio.

Returning now to FIGS. 16 and 17, evaporation stage 130 may employ a dryer for drying the resultant final stage solids 126, otherwise referred to as wet cake. The drying process may expose meal 18 to temperatures just high enough to vaporize ethanol vapor 132 from meal 18. Meal 18 may be altered and change color when exposed to high temperatures. By limiting the temperature that final stage solids 126 experience by using a low-energy drying process, the possibility of altering the meal 18 during evaporation stage 130 may be substantially reduced. Because final stage solids 126 may be dried at much lower temperatures and with less energy input than in conventional processes, a large volume of air may not be required during evaporation stage 130. Because a lower volume of air may be used in evaporation stage 130 for low-energy drying, the concentration of liquid in the resulting ethanol vapor 132 may be relatively high. Ethanol vapor 132 may also be condensed and re-used within biorefinery 10, reducing emissions from biorefinery 10. Because water used in evaporation stage 130 may be re-circulated, more of the water initially injected into the saccharification (if used) and fermentation processes of biorefinery 10 may be sent back to distillation system 42, where it may be captured and re-used, significantly reducing the overall water consumption of biorefinery 10. The specific equipment of FIGS. 16 and 17 are merely illustrative. Other specific equipment and processes may be used to implement multiple ethanol wash stages to increase the ethanol concentration of wet solids for the purpose of reducing the energy required to dry the wet solids.

Each stage of the solids processing (including steps in the wash/separation process) may be conducted on a single apparatus or (as indicated in FIGS. 16-18, for example) may be conducted on separate apparatus of the same type or including different types of apparatus (e.g., a filter belt system, separator, centrifuge, decanter, etc.); different stages of the processing of the solids component may be conducted on the same or on different/separate apparatus. In the processing of the wet solids (e.g. wet cake), additional operations to the wash/separation process, including operations such as soaking, re-mixing, slurrying, or other processing of the solids component may be conducted in various sequences, before, during or after washing and separating operations.

According to an exemplary embodiment, at least a portion of the solids processing can be conducted on a filter belt system shown as including filter belt 162 (see, e.g., FIGS. 18 through 24). The filter belt system may include one or more belts (e.g., for conveying material), some of which may be comprised of a filter media (e.g., to allow the filtration of material on and through the belt), bulk handling systems for loading and unloading the material into and from the system, controls and other instrumentation. The filter belt system may be segmented into stages or chambers (some of which may be configured to operate at differential pressure, including vacuum or positive pressure). According to other embodiments, other combinations of systems may be used for solids processing of the solids component (e.g., wet solids or wet cake).

Figure 18A:
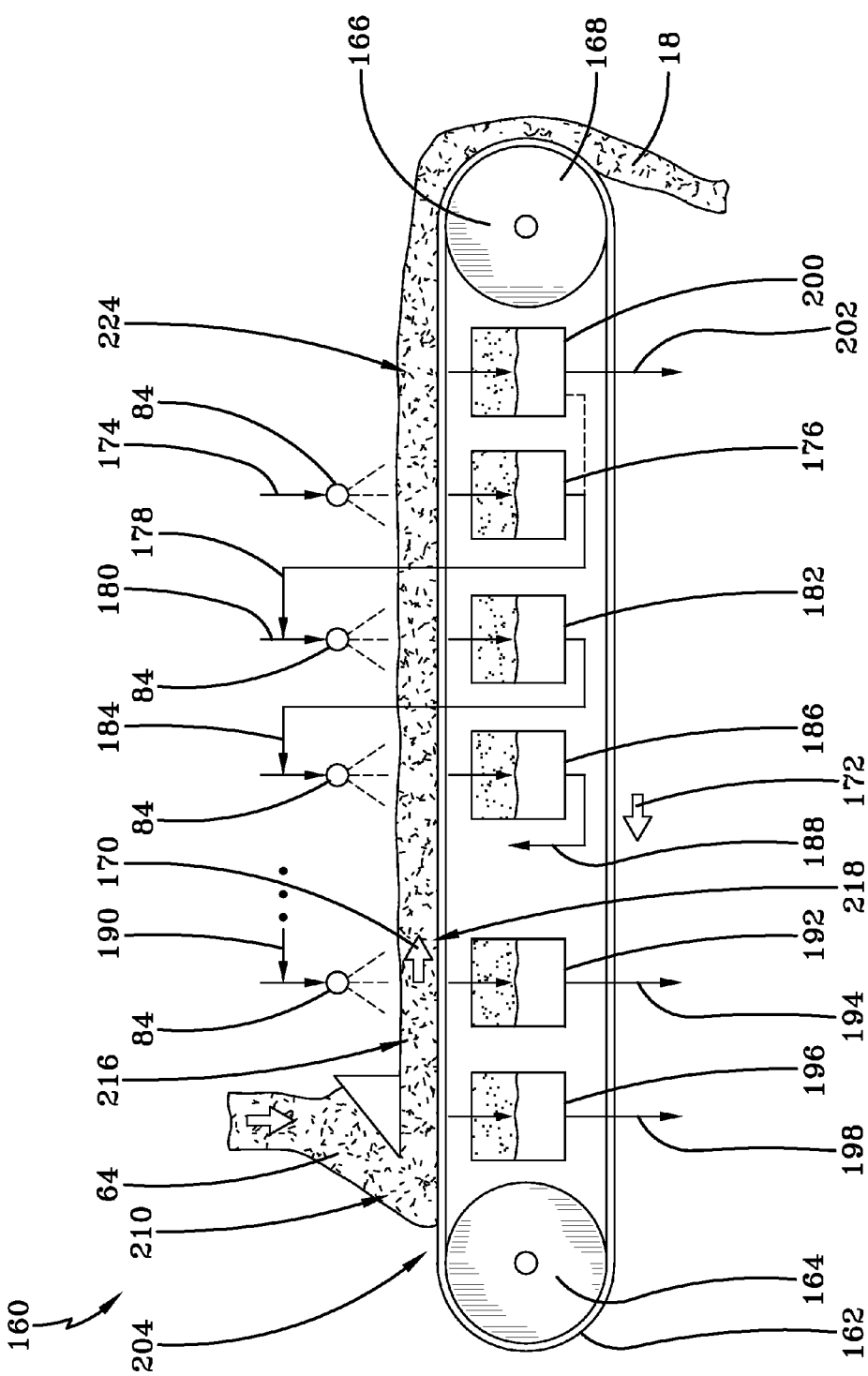
FIGS. 18A and 18B are cross-sectional views of an exemplary embodiment of a wash process capable of implementing multiple wash stages.
Figure 18B:
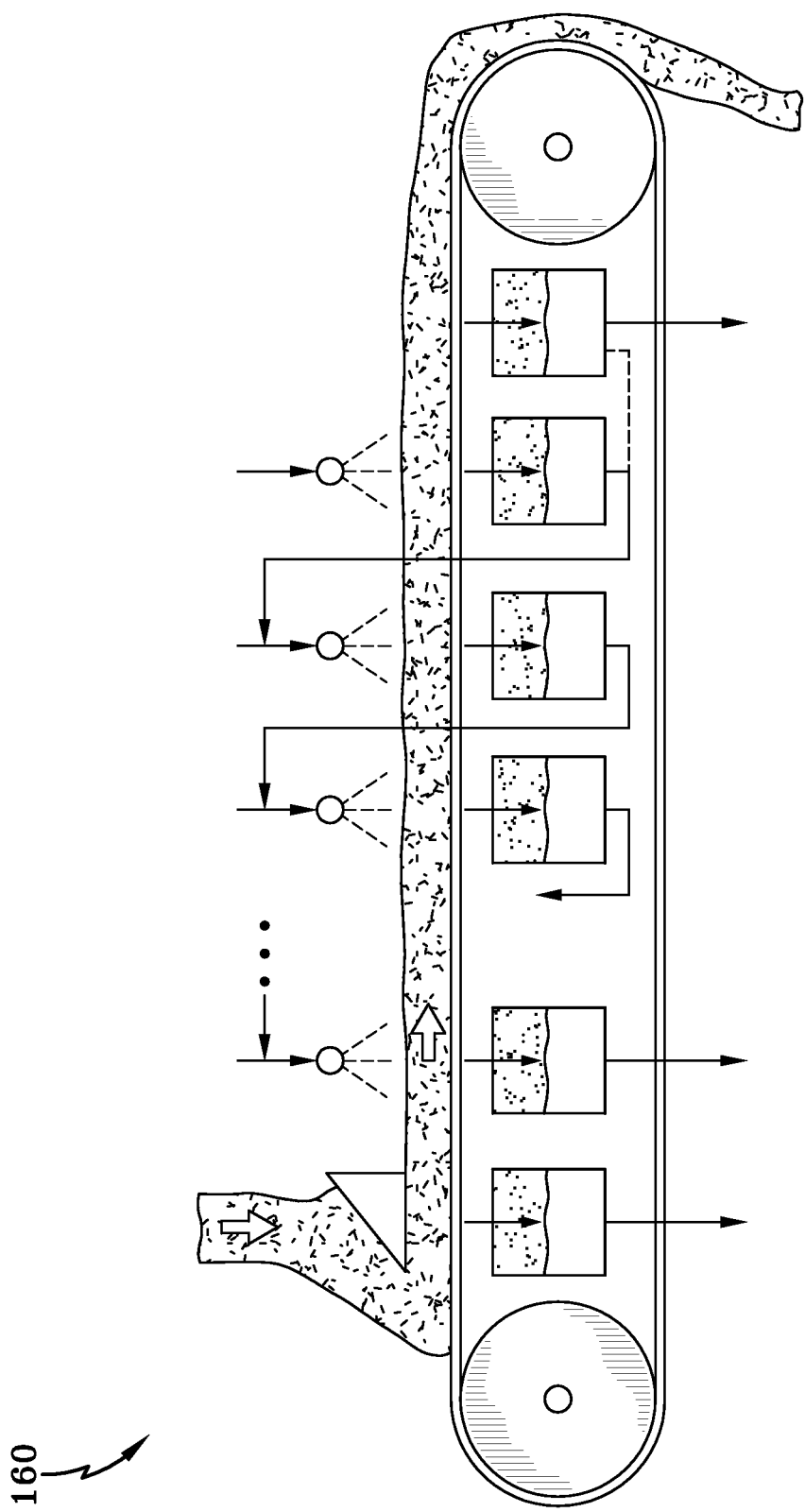

FIGS. 18A and 18B are cross-sectional views of an exemplary embodiment of an ethanol wash process 160 capable of implementing multiple ethanol wash stages. Ethanol wash process 160 comprises an apparatus shown as a filter belt 162 conveyed by a pair of rollers 164, 166. Rollers 164, 166 are configured to rotate in a clockwise fashion, as shown by arrow 168, causing filter belt 162 to move in a left-to-right direction from the top of roller 164 to the top of roller 166, as shown by arrow 170, and in a right-to-left direction from the bottom of roller 166 to the bottom of roller 164, as shown by arrow 172. The specific relative movement of filter belt 162 and rollers 164, 166 may vary among specific implementations.

Wet solids 64 may be loaded onto the top of filter belt 162 and may move in a left-to-right direction. The left-hand end of filter belt 162 may be referred to as the upstream end; the right-hand end of filter belt 162 may be referred to as the downstream end. Ethanol wash process 160 utilizes a counterflow ethanol wash process. Ethanol may flow through ethanol wash process 160 from the downstream end of filter belt 162 to the upstream end of filter belt 162; wet solids 64 may flow through ethanol wash process 160 from the upstream end of filter belt 162 to the downstream end of filter belt 162. The ethanol used for ethanol wash process 160 generally flows in a direction opposite from the flow of wet solids 64. The ethanol used for ethanol wash process 160 may alternatively flow in the same direction as wet solids 64.

Ethanol may be introduced into ethanol wash process 160 toward the downstream end of filter belt 162. A first stream of ethanol 174 may be applied to (e.g., poured over, sprayed onto, or deposited onto) wet solids 64 by ethanol distribution system 84 above a first downstream collection vessel 176. A mixture of water and ethanol may be drawn through filter belt 162 by gravity and/or vacuum into collection vessel 176 or the flow of the mixture of water and ethanol through filter belt 162 and into collection vessel 176 may be facilitated by positive differential pressure above filter belt 162. The water/ethanol mixture 178 from collection vessel 176 may then be combined with a second stream of ethanol 180, with the combination being applied to (e.g., poured over, sprayed onto, or deposited onto) wet solids 64 by ethanol distribution system 84 above a second downstream collection vessel 182, which is upstream of collection vessel 176. The first stream of ethanol 174 may have a higher, lower, or substantially similar concentration of ethanol than the second stream of ethanol 180. In other embodiments, the second stream of ethanol 180 may not be combined with the water/ethanol mixture 178 from collection vessel 176, but rather only the water/ethanol mixture 178 may be applied to wet solids 64. A mixture of water and ethanol may be drawn through filter belt 162 by gravity and/or vacuum into collection vessel 182 or the flow of the mixture of water and ethanol through filter belt 162 and into collection vessel 182 may be facilitated by positive differential pressure above filter belt 162. The water/ethanol mixture 184 from collection vessel 182 may then be applied to (e.g., poured over, sprayed onto, or deposited onto) wet solids 64 by ethanol distribution system 84 above a third downstream collection vessel 186, which is upstream of collection vessel 182.

Water/ethanol mixture 188 from collection vessel 186 may be directed toward other upstream ethanol distribution systems 84. Ultimately, water/ethanol mixture 190 may be applied to (e.g., poured over, sprayed onto, or deposited onto) wet solids 64 by ethanol distribution system 84 above a first upstream collection vessel 192. Water/ethanol mixture 194 from collection vessel 192 may be directed back to distillation system 42 to recapture some of the ethanol. A second upstream collection vessel 196 upstream of collection vessel 192 may collect water/ethanol mixture 198, which may also be directed back to distillation system 42 to recapture some of the ethanol. A final downstream collection vessel 200 downstream of collection vessel 176 may collect water/ethanol mixture 200, which may also be directed back to distillation system 42 to recapture some of the ethanol. Collection vessel 200 may also act as an evaporation stage, whereby the last remaining water/ethanol mixture 202 may be removed or joined with the water/ethanol mixture 178 from collection vessel 176. A separate drying process, such as evaporation stage 130 of FIGS. 16 and 17 and/or desolventizer 40 of FIGS. 13 and 14 may also be used downstream of ethanol wash process 160.

More or less pure ethanol may be applied to wash the wet solids at the various locations along the filter belt 162. Such concentrations, along with the flow rates of the wash fluid and the speed of the filter belt 162, may serve to control the rate of displacement of water in the wet solids by ethanol. Such factors may regulate the relative difference in ethanol content at each wash stage, as well as the ultimate ethanol content of the wet solids just before final drying.

Figure 19:
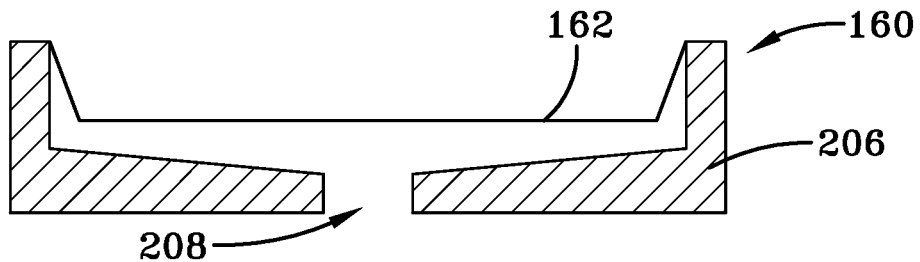
FIGS. 19 through 23 are cross-sectional views at various locations along the filter belt of FIGS. 18A and 18B.
Figure 20:
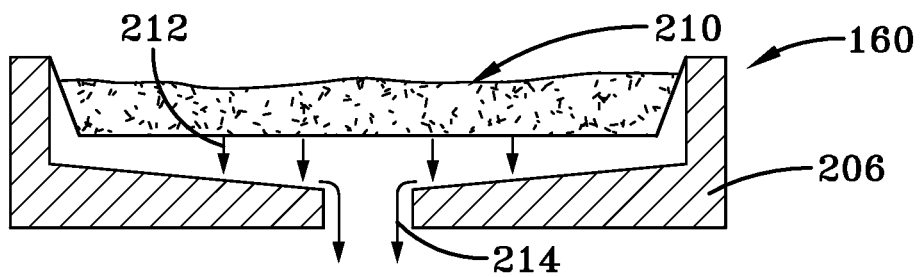
Figure 21:
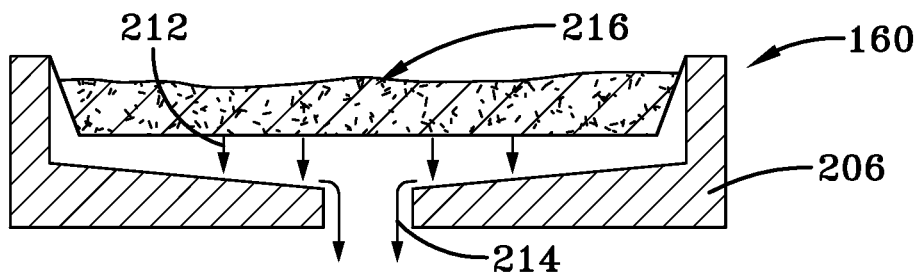
Figure 22A:
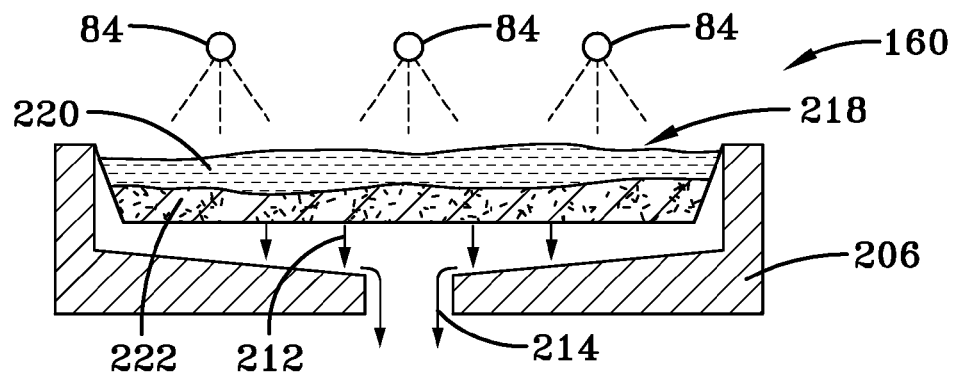
Figure 22B:
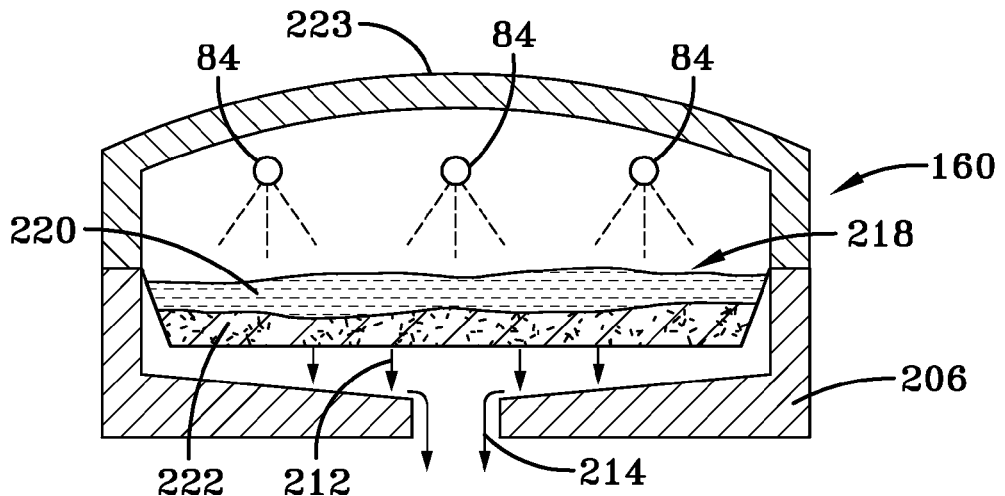
Figure 23:
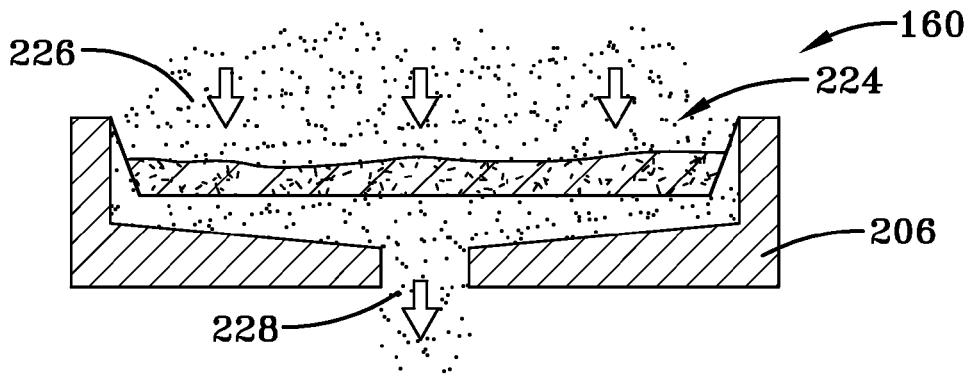

FIGS. 19 through 23 are cross-sectional views at various locations along filter belt 162 of FIGS. 18A and 18B. For example, FIG. 19 is a cross-sectional view of filter belt 162 of FIGS. 18A and 18B upstream of the location where wet solids 64 are placed onto filter belt 162 shown by arrow 204 in FIGS. 18A and 18B. Although any filter belt technology may be employed, filter belt 162 may have a substantially perforated or porous structure such that a liquid component of wet solids 64 on filter belt 162 may be drawn through filter belt 162 or the flow of the mixture of water and ethanol through filter belt 162 may be facilitated by positive differential pressure above filter belt 162. Filter belt 162 may also include a collection tray 206, which may facilitate the collection of water/ethanol mixtures collected through filter belt 162. Collection tray 206 may include a collection opening 208, through which water/ethanol mixtures may be collected into collection vessels. FIG. 20 is a cross-sectional view of filter belt 162 of FIGS. 18A and 18B at a location where wet solids 64 are placed onto filter belt 162 shown by arrow 210 of FIGS. 18A and 18B. A vacuum or gravity beneath filter belt 162 may draw a water/ethanol mixture 212 from wet solids 64 onto collection tray 206 and into collection vessel 196, as shown by arrows 214. FIG. 21 is a cross-sectional view of filter belt 162 of FIGS. 18A and 18B upstream of ethanol distribution system 84 shown by arrow 216. At this point on filter belt 162, wet solids 64 will contain a certain concentration of ethanol. FIG. 22A is a cross-sectional view of filter belt 162 of FIGS. 18A and 18B at a location near ethanol distribution system 84 shown by arrow 218. At this point, ethanol is introduced into wet solids 64 by ethanol distribution system 84, transforming wet solids 64 into a mixture of liquids 220 (e.g., a water/ethanol mixture) and solids 222. A vacuum or gravity beneath filter belt 162 may draw a water/ethanol mixture 212 from wet solids 64 onto collection tray 206 and into a collection vessel, as shown by arrows 214. FIG. 22B is a cross-sectional view of filter belt 162 of FIGS. 18A and 18B at a location near ethanol distribution system 84 shown by arrow 218. A pressure chamber 223 may be used to create a differential pressure between the top and bottom of filter belt 162. Pressure may be applied within pressure chamber 223 to facilitate washing by effectively facilitating the flow of the ethanol through wet solids 64. Wet solids 64 downstream of location 218 of filter belt 162 will have a higher ethanol concentration than wet solids 64 upstream of location 218 of filter belt 162. FIG. 23 is a cross-sectional view of filter belt 162 of FIGS. 18A and 18B at a location near collection vessel 200, as shown by arrow 224. Collection vessel 200 may be used as an evaporation stage. Heated gas 226 may be applied to wet solids 64 above filter belt 162. A vacuum or gravity beneath filter belt 162 may draw heated gas 226 through wet solids 64 and an ethanol vapor 228 may be collected and further processed to recover ethanol and other desirable components present in ethanol vapor 228.

Figure 24:
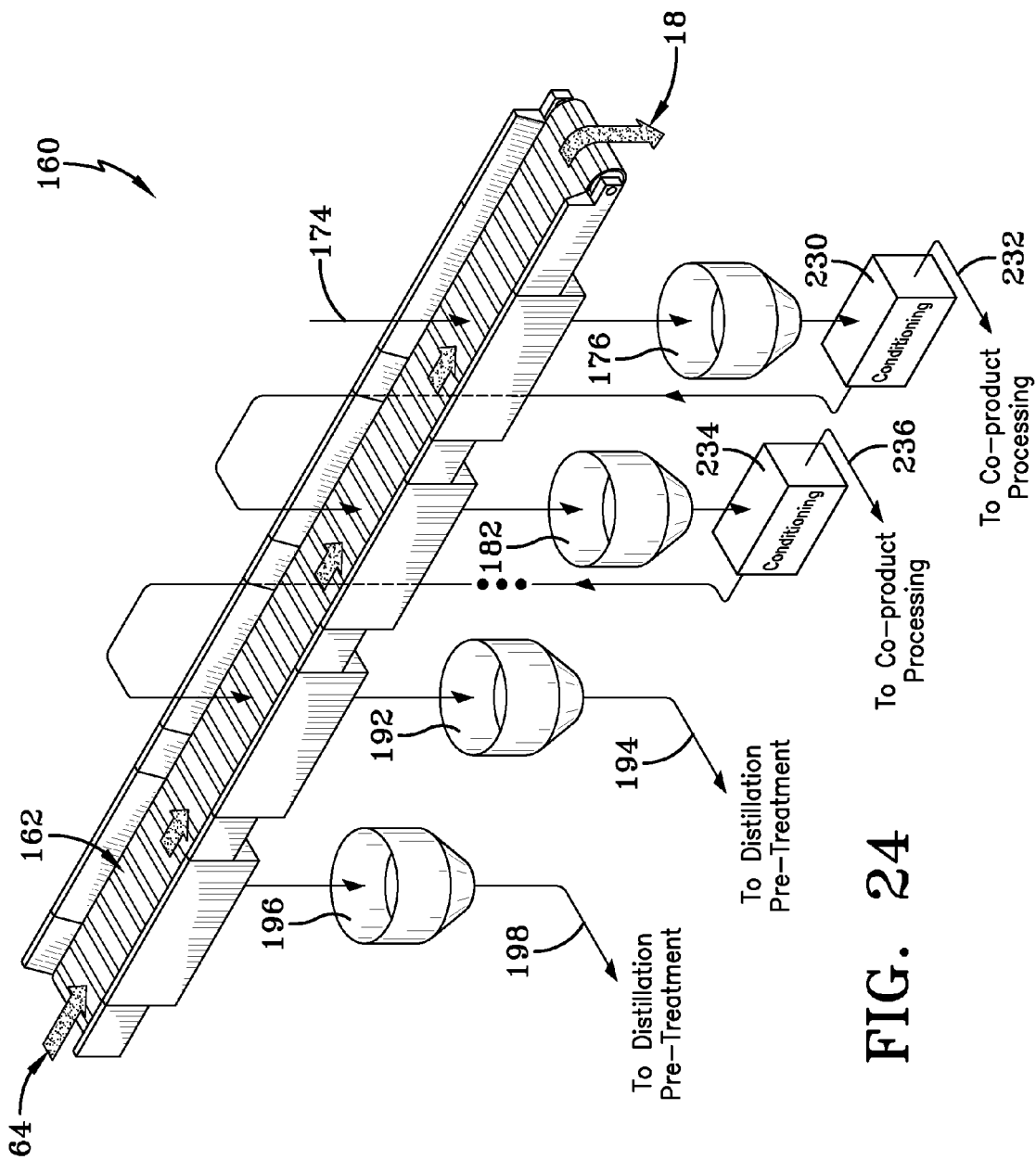
FIG. 24 is a perspective view of an exemplary embodiment of the ethanol wash process.

FIG. 24 is a perspective view of another exemplary embodiment of ethanol wash process 160. Wet solids 64 may be placed on filter belt 162 at an upstream location with meal 18 exiting at a downstream location of filter belt 162. An initial collection vessel 196 may collect water/ethanol mixture 198 without washing, which may be directed back to distillation pre-treatment process 44. The first stream of ethanol 174 may be applied to wet solids 64 above collection vessel 176. A mixture of water and ethanol may be drawn through filter belt 162 by gravity and/or vacuum into collection vessel 176 or the flow of the mixture of water and ethanol through filter belt 162 and into collection vessel 176 may be facilitated by positive differential pressure above filter belt 162. The water/ethanol mixture from collection vessel 176 may be directed into a first conditioning process 230, which may filter and condition the water/ethanol mixture. A portion of the ethanol/water mixture may be directed to co-product processing, as shown by arrow 232; filtered/conditioned ethanol from conditioning process 230 may be applied to wet solids 64 above collection vessel 182.

A mixture of water and ethanol may be drawn through filter belt 162 by gravity and/or vacuum into collection vessel 182 or the flow of the mixture of water and ethanol through filter belt 162 and into collection vessel 182 may be facilitated by positive differential pressure above filter belt 162. The water/ethanol mixture from collection vessel 182 may be directed into a second conditioning process 234, which may filter and condition the water/ethanol mixture. A portion of the ethanol/water mixture may be directed to co-product processing, as shown by arrow 236; filtered/conditioned ethanol from conditioning process 234 may be applied to wet solids 64 above previous upstream collection vessels. Ultimately, a mixture of water and ethanol may be drawn through filter belt 162 by gravity and/or vacuum into collection vessel 192 or the flow of the mixture of water and ethanol through filter belt 162 and into collection vessel 192 may be facilitated by positive differential pressure above filter belt 162. The water/ethanol mixture 194 from collection vessel 192 may be directed to distillation pre-treatment process 44.

In certain embodiments, the apparatus comprising a filter belt may include two or more such belts. For example, a first belt may be used for a first stage of washing with ethanol (or another solvent), while further filter belts may be used for subsequent stages. The material conveyed with the belts may be transferred from one belt to the other as the process progresses. Some embodiments may include intermediate equipment between filter belts, such as mixers for creating a slurry with the solvent or solvent mixture, centrifuges or other separators for performing some degree of moisture removal, and so forth. The filter belts themselves may be of any suitable type, including arrangements in which a semi-permeable belt serves as a substrate used to receive the solids component, and apparatuses with multiple layers of belts, support structures, and so forth.

Figure 25:
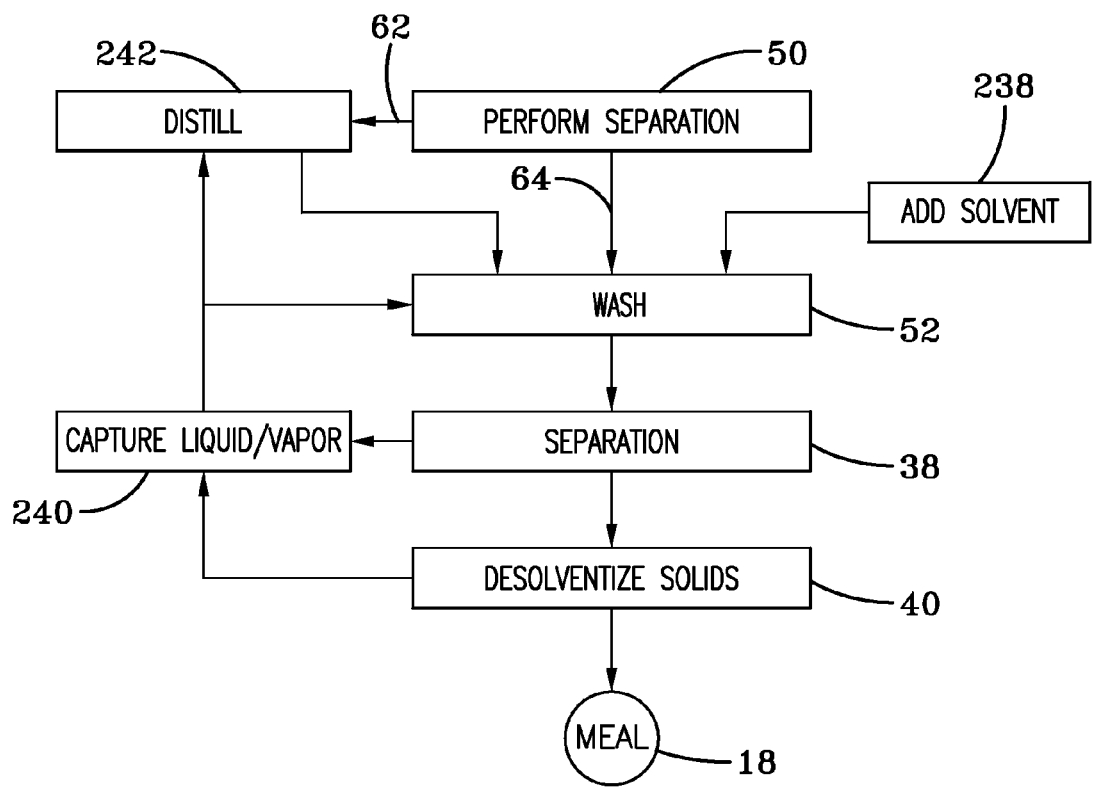
FIG. 25 is a flow chart of the exemplary embodiment of the solids washing processes.

FIG. 25 is a flow chart of an exemplary embodiment of solids processing system 34. Separation process 50 may be performed to separate a liquid component shown as liquid 62 (e.g., a water/ethanol mixture) from a solids component shown as wet solids 64 (e.g., a certain amount of ethanol, a certain amount of water, syrup, particulate matter, and dissolved solids). Wet solids 64 may then be washed with ethanol (e.g., wash process 52). For example, a solvent (e.g., ethanol) may be added to wet solids 64, as shown by block 238. Once ethanol has been added to wet solids 64, wet solids 64 may be separated to remove a mixture of water and ethanol from wet solids 64 (e.g., separation process 38). Wet solids 64 will contain a higher concentration of ethanol than before wash process 52 and separation process 38. Wet solids 64 may then be desolventized to remove remaining liquids from wet solids 64 to produce meal 18 (e.g., desolventizing process 40). In each of separation process 38 and desolventizing process 40, liquid and vapor may be captured, as shown by block 240. The liquid and vapor may be distilled and used as a source of ethanol in wash process 52, as shown by block 242. The liquid and vapor may be re-used by wash process 52.

Figure 26:
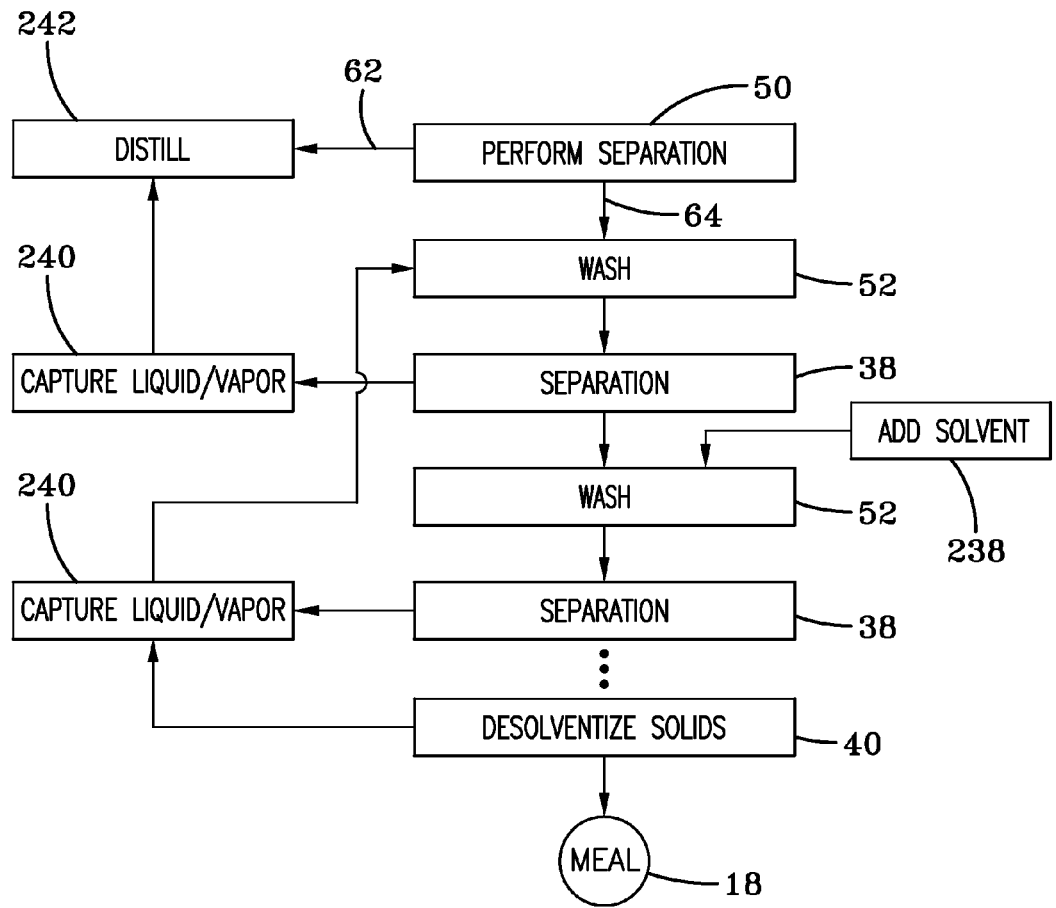
FIG. 26 is a flow chart of the exemplary embodiment of multiple solids washing processes.

FIG. 26 is a flow chart of an exemplary embodiment of multiple solids processing system 34 stages. Separation process 50 may be performed to separate a liquid component shown as comprising liquid 62 (e.g., a water/ethanol mixture) from a solids component shown as comprising wet solids 64 (e.g., a certain amount of ethanol, a certain amount of water, syrup, particulate matter, and dissolved solids). Wet solids 64 may then be washed with ethanol (e.g., wash process 52). Once ethanol has been added to wet solids 64, wet solids 64 may be separated to remove a mixture of water and ethanol from wet solids 64 (e.g., separation process 38). Wet solids 64 will contain a higher concentration of ethanol than before wash process 52 and separation process 38. Subsequent ethanol wash stages may be used to further increase the ethanol concentration of wet solids 64 before desolventizing process 40. For example, wet solids 64 may be washed again with concentrated ethanol (e.g., wash process 52). For example, a solvent (e.g., ethanol) may again be added to wet solids 64, as shown by block 238. Once ethanol has again been added to wet solids 64, wet solids 64 may be separated again to remove a mixture of water and ethanol from wet solids 64 (e.g., separation process 38). Wet solids 64 may contain an even higher concentration of ethanol than before ethanol wash processes 52 and separation processes 38. Wet solids 64 may then be desolventized to remove remaining liquids from wet solids 64 to produce meal 18 (e.g., desolventizing process 40). In each of separation processes 38 and desolventizing process 40, liquid and vapor may be captured, as shown by blocks 240. The liquid and vapor may be re-distilled and used in other processes internal and/or external to biorefinery 10, as shown by block 242. The liquid and vapor may be re-used by previous wash processes 52.

Figure 27:
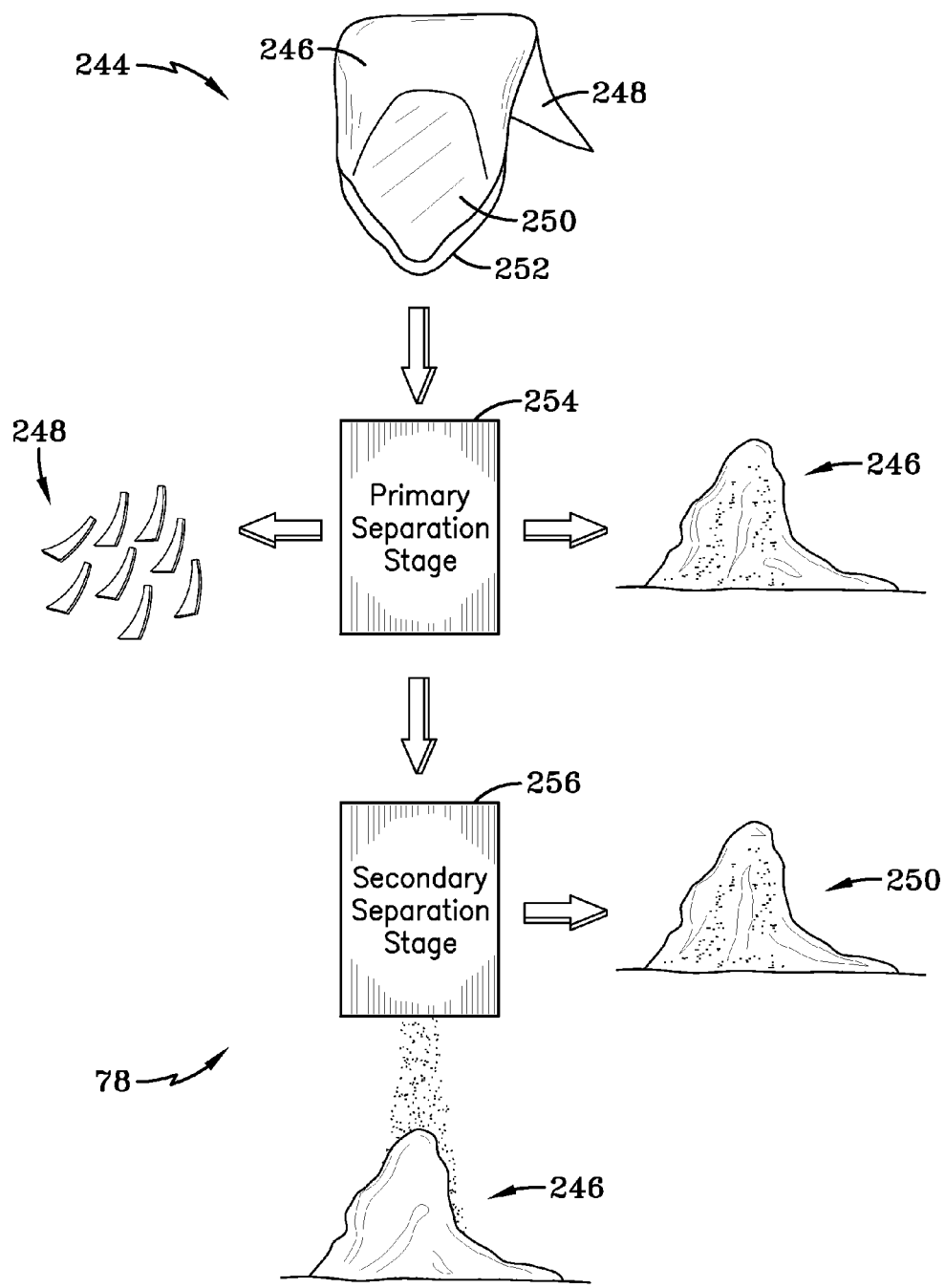
FIG. 27 is a process flow diagram of an exemplary embodiment of the fractionation process.

Various processes upstream of solids processing system 34 may also lead to significant tangible benefits. For example, FIG. 27 is a process flow diagram of an exemplary embodiment of fractionation process 78. Exemplary processes are described in U.S. Patent Application Publication No. 2005/0233030, U.S. Patent Application Publication No. 2007/0037267, U.S. Patent Application Publication No. 2007/0178567, and U.S. Patent Application Publication No. 2007/0202214, each of which is incorporated by reference. Corn 12 may initially be processed into individual corn kernels 244, which may be fractionated within fractionation process 78. Each corn kernel 244 may be comprised of endosperm 246, fiber 248, germ 250, and a tip cap 252. Endosperm 246 comprises most of the starches and proteins available in corn kernel 244 and is used in fermentation process 28 to generate ethanol 16. Endosperm 246 represents the fermentable solids 58 of corn kernel 244; germ and fiber represent the non-fermentable solids 56 of corn kernel 244, which may be withheld from fermentation process 28. Endosperm 246 comprises approximately 80-85% of corn kernel 244 by mass, germ 250 comprises approximately 10-15% of corn kernel 244 by mass, and fiber 248 comprises approximately 5-10% of corn kernel 244 by mass.

Fractionation process 78 prepares corn kernels 244 for saccharification and fermentation in saccharification process 26 and fermentation process 28. Fractionation process 78 reduces corn kernel 244 to make starches and proteins within corn kernel 244 more readily available for saccharification and fermentation. For example, corn kernel 244 may first be fractionated into its component parts, such as germ 250, fiber 248, and endosperm 246. Tempered whole corn may be fed into a primary separation stage 254, which substantially separates corn kernel 244 into components (e.g., fractions) of endosperm germ 250, fiber 248, and endosperm 246. Primary separation stage 254 may also separate out fiber 248 (e.g., bran) and flour (e.g., comprising a fine powder of endosperm 246) and may direct the remaining components of corn kernel 244 into a secondary separation stage 256. Fiber 248 from primary separation stage 254 may be processed through a secondary starch recovery process. The secondary starch recovery process may include a milling stage, a separation stage, and a mechanical fiber dusting stage. The milling stage may utilize a pin mill, a hammer mill, a roller mill, or other suitable mill technology.

Secondary separation stage 256 may further remove germ 250 from endosperm 246. Germ 250 from secondary separation stage 256 may pass through a secondary refining (or purification) process, which may include a milling stage and a separation stage. The milling stage may utilize a roller mill. Grits (e.g., endosperm 246) from the secondary refining process may be passed to a mechanism for reducing their size, such as a hammer mill, prior to fermentation.

Fractionating corn kernel 244 to separate endosperm 246 (e.g., fermentable solids) from germ 250 and fiber 248 (e.g., non-fermentable solids) may provide several benefits to processes downstream of fractionation process 78. For example, using primarily endosperm 246 in saccharification process 26 may enhance the efficiency of saccharification process 26 because non-fermentable solids 56 are generally not involved in saccharification process 26. The fact that the fermentation slurry from saccharification process 26 includes primarily endosperm 246, water, and enzymes may also lead to fermentation process 28 being more efficient because non-fermentable solids 56 are generally not involved in fermentation process 28.

By fractionating corn kernel 244 prior to fermentation, the levels of proteins (e.g., zein) may be increased. For example, removing germ 250 and fiber 248 fractions prior to fermentation process 28 may concentrate proteins in the fermentation slurry delivered to fermentation process 28. Proteins are generally isolated in endosperm 246 of corn kernel 244 and fractionation of protein-enriched endosperm 246 results in concentration of proteins in residuals from fermentation process 28.

Endosperm 246 from secondary separation stage 256 may be directed into a milling process, where endosperm 246 may be milled and reduced in particle size to prepare the ground endosperm for saccharification process 26 and fermentation process 28. Endosperm 246 may be reduced using any suitable method, including grinding, to make starches within endosperm 246 more readily available for saccharification process 26 and fermentation process 28. The specific equipment used to grind endosperm 246 may include, for example, a ball mill, a roller mill, a hammer mill, or any other type of mill capable of grinding endosperm 246 for the purpose of particle size reduction. The use of emulsion technology, sonic pulsation, rotary pulsation, and other particle size reduction methods may be utilized to increase the surface area of endosperm 246, while also raising the effectiveness of flowing the liquefied media (e.g., decreased viscosity). The ground endosperm 246 may be referred to as being or including "raw starch." Grinding endosperm 246 exposes more surface area of endosperm 246 and may facilitate saccharification process 26 and fermentation process 28.

Figure 28:
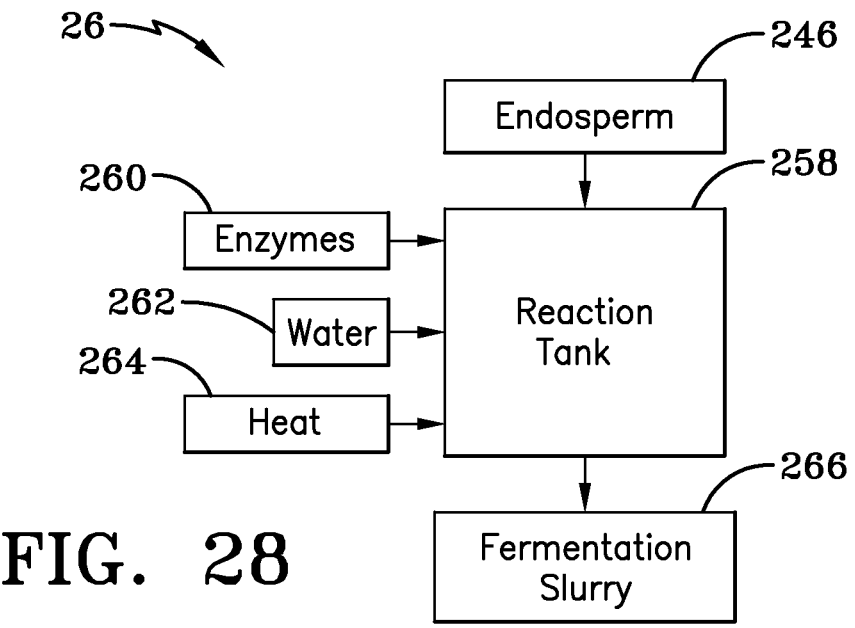
FIG. 28 is a block flow diagram of an exemplary embodiment of the saccharification process.

Ground endosperm 246 from fractionation process 78 may be directed into saccharification process 26, in which starches within ground endosperm 246 may be converted into sugars that may be fermented in fermentation process 28. FIG. 28 is a block flow diagram of an exemplary embodiment of saccharification process 26. Endosperm 246 may be combined in a reaction tank 258 with a saccharifying enzyme composition 260, water 262, and heat 264 to facilitate the conversion. The saccharifying enzyme composition 260 may include an amylase, such as an alpha amylase (e.g., an acid fungal amylase). The saccharifying enzyme composition 260 may also include glucoamylase. The saccharifying enzyme composition 260 may also include acid fungal amylase for hydrolyzing raw starch within ground endosperm 246.

The term "saccharifying" refers to the process of converting starches within ground endosperm 246 into smaller polysaccharides and eventually to monosaccharides, such as glucose. Conventional saccharification methods use liquefaction of gelatinized starch to create soluble dextrinized substrates that hydrolyze into glucose. Saccharification process 26 may be conducted without cooking. The phrase "without cooking" generally refers to a process for converting starch to sugars without heat treatment for gelatinization and dextrinization of starches within ground endosperm 246. "Without cooking" (e.g., a "raw starch" process) refers to maintaining a temperature below starch gelatinization temperatures of ground endosperm 246 such that saccharification occurs directly from the raw native insoluble starch to soluble glucose, while bypassing conventional starch gelatinization conditions. Starch gelatinization temperatures are typically in a range of 57-93° C., depending on the starch source and polymer type. Saccharification process 26 may be conducted in a temperature range of approximately 25-40° C. Exemplary processes are described in U.S. Patent Application Publication No. 2004/0234649, U.S. Patent Application Publication No. 2005/0233030, U.S. Patent Application Publication No. 2005/0239181, U.S. Patent Application Publication No. 2007/0037267, U.S. Patent Application Publication No. 2007/0178567, U.S. Patent Application Publication No. 2007/0196907, and U.S. Patent Application Publication No. 2007/0202214, each of which is incorporated by reference.

Saccharification process 26 may include mixing ground endosperm 246 with a liquid (e.g., water 262), which may form a slurry or suspension, and adding a saccharifying enzyme composition 260 to the slurry. The addition of the saccharifying enzyme composition 260 may occur before or during mixing of ground endosperm 246 with water 262. Saccharification process 26 may convert raw or native starch to sugars at a faster rate as compared to conventional saccharification methods that utilize cooking. The percentage of ground endosperm 246 to water 262 may be higher as compared to conventional saccharification methods that utilize cooking because, unlike conventional processes, saccharifying ground endosperm 246 without cooking does not include gelatinization, which increases viscosity.

Saccharification process 26 may utilize any enzyme sources suitable for saccharifying starches within ground endosperm 246 to produce fermentable sugars without cooking. The saccharifying enzyme composition 260 may include an amylase, such as an alpha amylase (e.g., an acid fungal amylase) or a glucoamylase. The initial pH of saccharification process 26 may be adjusted by the addition of, for example, ammonia, sulfuric acid, phosphoric acid, or process waters (e.g., stillage or backset, evaporator condensate or distillate, side stripper bottoms).

The ability of saccharification process 26 to convert starches within ground endosperm 246 to produce fermentable sugars without cooking ground endosperm 246 may provide several tangible benefits. For example, meal 18 that is ultimately produced by biorefinery 10 may generally be of higher quality because ground endosperm 246 is not cooked. Meal 18 produced by biorefinery 10 may include elevated levels of protein as compared to conventional DDG 54. Meal 18 produced by biorefinery 10 may also include elevated levels of B vitamins, vitamin C, vitamin E, folic acid, amino acids (e.g., lysine), and/or vitamin A as compared to conventional DDG 54. Meal 18 produced by biorefinery 10 may also have improved physical characteristics, such as decreased caking or compaction and increased ability to flow.

Figure 29:
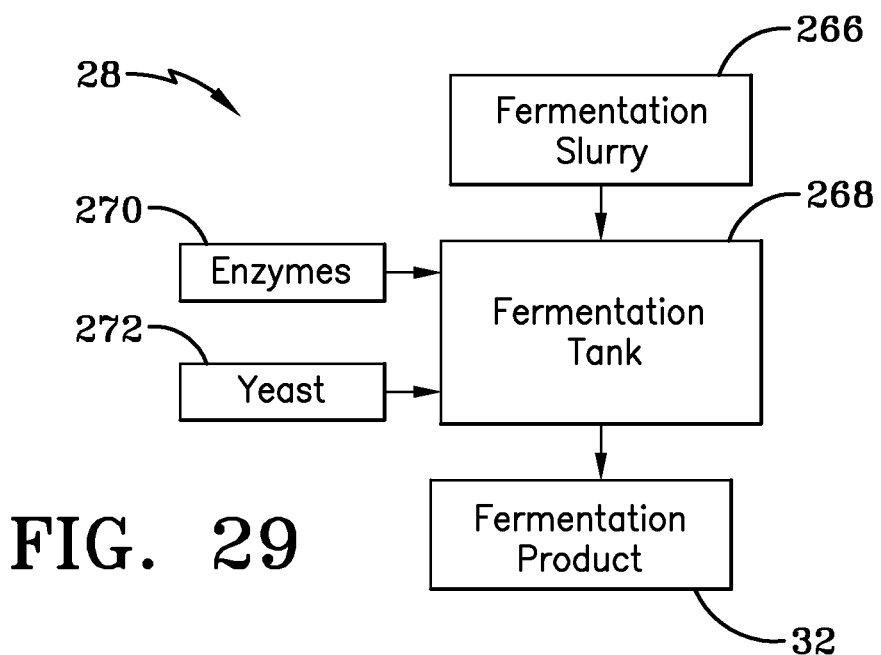
FIG. 29 is a block flow diagram of an exemplary embodiment of the fermentation process.

Fermentation slurry 266 from saccharification process 26 may be directed into fermentation process 28, in which the sugars within the fermentation slurry 266 are fermented to produce ethanol 16. FIG. 29 is a block flow diagram of an exemplary embodiment of fermentation process 28. Exemplary processes are described in U.S. Patent Application Publication No. 2004/0234649, U.S. Patent Application Publication No. 2005/0233030, U.S. Patent Application Publication No. 2005/0239181, U.S. Patent Application Publication No. 2007/0037267, U.S. Patent Application Publication No. 2007/0178567, U.S. Patent Application Publication No. 2007/0196907, and U.S. Patent Application Publication No. 2007/0202214, each of which is incorporated by reference. Fermentation slurry 266 may be combined in fermentation tank(s) 268 with enzymes 270 and yeast 272 to facilitate fermentation. Fermentation process 28 may be facilitated by mixing the yeast 272 with fermentation slurry 266 under conditions suitable for growth of the yeast 272 and production of ethanol 16. Fermentation slurry 266 contains sugars that have been converted from starches without cooking.

Any of a variety of yeasts 272 may be utilized as the yeast starter in fermentation process 28. Yeast 272 may be selected to provide rapid growth and fermentation rates in the presence of high temperature and high ethanol levels. The amount of yeast starter utilized is selected to effectively produce a commercially significant quantity of ethanol 16 within a suitable time from (e.g., less than 72 or 144 hours). Yeast 272 may be added to fermentation slurry 266 by any of a variety of methods known for adding yeast 272 to fermentation processes. Yeast starter may be added as a dry batch, or by conditioning/propagating. Yeast starter may also be added as a single inoculation.

Fermentation process 28 may be conducted as either a continuous process or a batch process. As a continuous process, fermentation slurry 266 from saccharification process 26 may be moved (e.g., pumped) through a series of vessels (e.g., tanks) to provide a sufficient duration for fermentation process 28. Fermentation process 28 may also include multiple stages of vessels. For example, fermentation slurry 266 from saccharification process 26 may be fed into the top of a first vessel stage, partially fermented slurry drawn out of the bottom of the first vessel stage may be fed into the top of a second vessel stage, and partially fermented slurry drawn out of the bottom of the second vessel stage may be fed into the top of a third vessel stage. As a batch process, fermentation slurry 266 may be directed into a vessel, where the fermentation cycle may be completed before the vessel is emptied.

Output from fermentation process 28 may include the fermentation product shown as beer 32. Ethanol 16 may be recovered from liquids in beer 32, meal 18 may be recovered from solids in beer 32, and other various by-products (e.g., proteins and corn syrup) may be separated from beer 32. Fermentation process 28 may generate a relatively large amount of carbon dioxide ($CO_2$) and other gases. A system may be installed at biorefinery 10 to capture, re-use, and/or otherwise dispose (e.g., via sequestration) of the gases.

Figure 30:
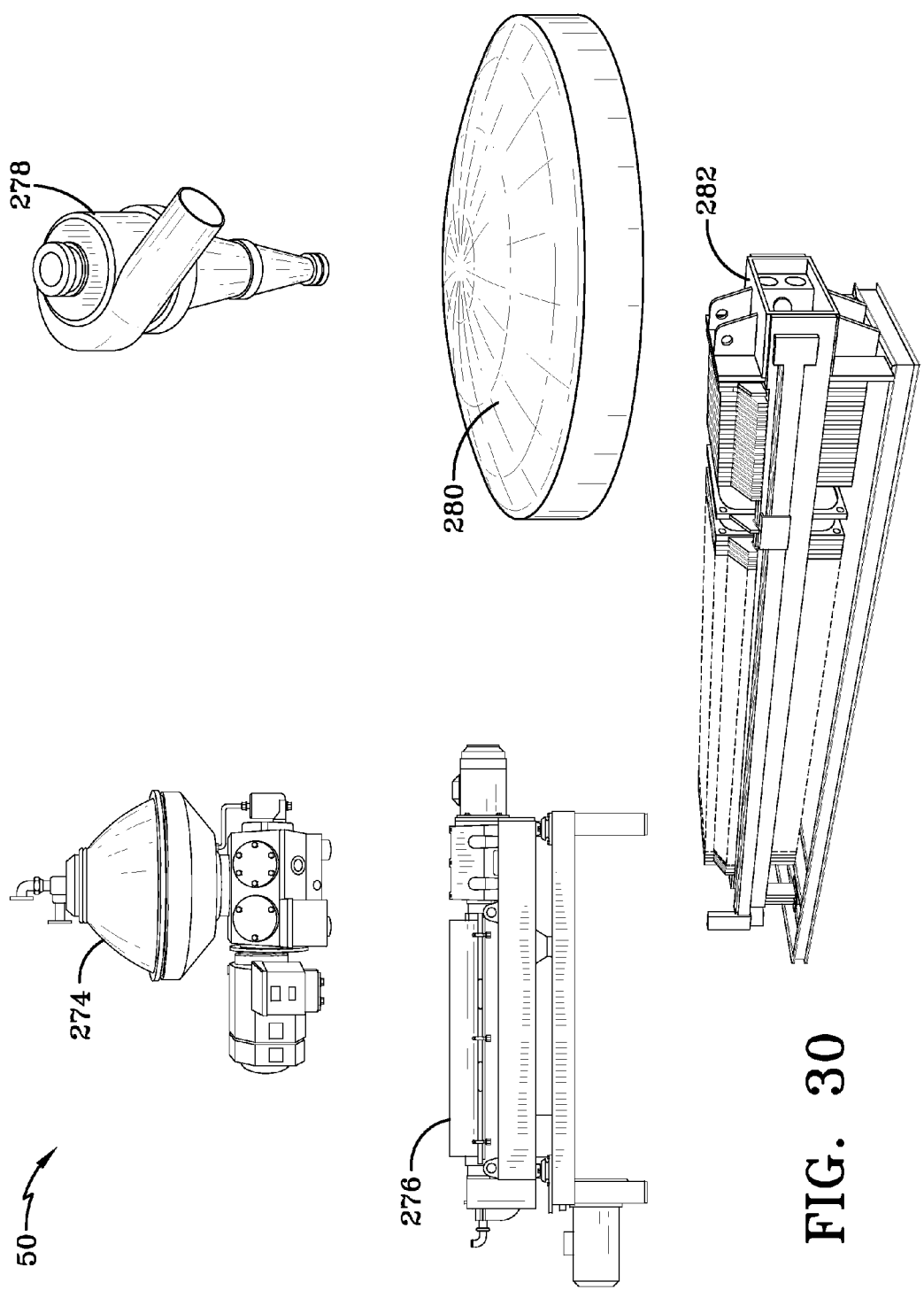
FIG. 30 illustrates exemplary embodiments of the separation process.

Fermentation product 32 (e.g., beer) may be separated by separation process 50 into a liquid component (e.g., liquid 62) and a solids component (e.g., wet solids 64). FIG. 30 illustrates exemplary embodiments of separation process 50. Liquid 62 may be directed into distillation system 42, where ethanol 16 may be produced. By directing primarily liquid 62 to distillation system 42, equipment of distillation system 42 may be less susceptible to fouling, which is usually caused by solids present when fermented beer is distilled directly, such as in conventional methods. Because liquid 62 has substantially fewer solids, occurrences of fouling may be substantially reduced. With a reduced susceptibility to fouling, complicated anti-fouling provisions may be unnecessary, reducing the complexity and cost of distillation system 42. Because liquid 62 is substantially free of solids components, heat energy applied to distillation system 42 may only have to heat those minimal solids dissolved in liquid 62, reducing heat energy requirements of distillation system 42 compared to conventional distillation systems, which must heat both the solids and liquid components of fermented beer.

Wet solids 64 may be directed into solids processing system 34, where ethanol (or other solvents) may be added to wet solids 64 to decrease the boiling point, heat capacity, and enthalpy (heat) of vaporization of wet solids 64. The ethanol concentration of wet solids 64 from separation process 50 may generally be determined by fermentation process 28, and may typically fall within a range of 10-20% by volume, although ethanol concentrations above and below this range may also be used. A substantial portion of water will be removed from beer 32 as liquid 62 and, as such, the boiling point, heat capacity, and enthalpy (heat) of vaporization of wet solids 64 may be reduced downstream of separation process 50 as compared to beer 32 upstream of separation process 50. The amount of energy required to dry/desolventize wet solids 64 (i.e., having a lower boiling point, heat capacity, and enthalpy (heat) of vaporization) may be substantially reduced compared to conventional deliquification/drying systems, which must deliquify and dry stillage containing higher concentrations of water (i.e., having a higher boiling point, heat capacity, and enthalpy (heat) of vaporization).

By separating liquid components (e.g., liquid 62) from the solids components (e.g., wet solids 64) of beer 32 prior to distillation system 42, the favorable physical characteristics of ethanol may be exploited (particularly the low boiling point, low specific heat, and low enthalpy (heat) of vaporization of ethanol) to evaporate liquid matter from wet solids 64, producing meal 18. Rather than drying stillage that has been processed in a distillation system and contains little to no ethanol, ethanol-containing wet solids 64 may be dried using lower amounts of energy as compared to conventional methods. Separation process 50 may be performed by any suitable separation means including, but not limited to, a disk-type centrifuge 274, a decanter centrifuge 276, a hydroclone 278, a sedimentation tank 280, or a filter press 282. Indeed, any type of separator capable of separating liquid 62 from wet solids 64 may be used.

Meal 18 produced by biorefinery 10 may also be reconstituted into feed at a desired composition to differentiate the product for various markets. For example, some protein and any extracted biochemicals or other bioproducts may be re-applied to the resulting meal to constitute the desired end product. Levels of protein and other amino acids could be selectively adjusted. For example, proteins, fats, syrup, oils, lutein, lysine, zein, and other bioproducts and biochemicals may be selectively combined with the meal. According to preferred embodiment, processing of the meal may take place at temperatures that avoid degradation of the meal itself. The use of such reduced temperatures at all stages of processing (through the plant) results in a meal that is of a different quality than conventional DDG (i.e., resulting from a process employing "cooked" liquefaction). For example, maintaining the processing temperatures below about 150° C. is believed to produce a product that is quite distinct from conventionally processed DDG, and even lower temperatures, on the order of 100° C. (or even lower, at 93° C., 180° F., or 130° F.) are particularly helpful in creating a unique meal.

Depending upon the processing, the meal may be referred to as "corn meal" (particularly when corn is the feedstock), "distillers meal", "distillers dried meal", "dried distillers meal", "protein-containing meal", and "corn distillers meal", among others. When the solids component is subject to the distillation process, the resulting product may be different still, somewhat more akin to conventional DDG, although certain benefits of the processing are nevertheless realized, such as the reduction in energy utilization in the biorefinery.

The meal may also be further transformed for particular product categories and markets. For example, the meal may be mechanically pressed or extruded into pellets configured for packaging, transportation, durability, and digestibility. Such processing may be well suited for producing animal feeds. Within this category of product, a number of varieties may be formulated including different ingredients, protein qualities, additives, sizes, and configurations.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A method for reducing the water content of a solid component prepared from a fermentation product of a fermentation process in a biorefinery that performs distillation of ethanol wherein the fermentation product provides for an aqueous-ethanolic component and a solids component, the method comprising the steps of:
   (a) partially separating the aqueous-ethanolic component from the solids component to provide a separated solids component having a reduced amount of the aqueous-ethanol component;
   (b) depositing at least a portion of the separated solids component on an apparatus comprising a belt;
   (c) transporting the solids component along the apparatus by movement of the belt while conducting at least two separate addition-removal procedures thereto, wherein each procedure comprises:
      (i) adding an ethanol solution to the separated solids component, wherein the ethanol content of the solution of each procedure is higher than the ethanol content remaining in the separated solids component; and
      (ii) removing at least a portion of liquid therefrom such that after each addition-removal procedure the water content in the separated solids component is lower than the prior procedure; and
   (d) at least partially drying the separated solids component.

2. The method of claim 1 wherein the solids component is deposited continuously as the belt is moved.

3. The method of claim 1 wherein the solids component is disposed at a substantially uniform thickness over the belt.

4. The method of claim 1 wherein the belt comprises a continuous semipermeable belt, and wherein the solvent is applied above the solids component and passes through the solids component and through the belt.

5. The method of claim 1 wherein the apparatus comprises two or more belts, such that the two or more addition-removal procedures are performed on two or more belts.

6. The method of claim 5 wherein the apparatus further comprises at least one mixing device between the two or more belts for creating a slurry of the separated solids component and the ethanol solution of step (c).

7. The method of claim 1 wherein the solids component comprises proteins obtained from corn.

8. The method of claim 1 comprising collecting liquid and/or gas from the solids component, and increasing ethanol content of the liquid and/or gas collected from the solids component to obtain a higher ethanol-content liquid, and wherein the higher ethanol-content liquid is applied to the solids component.

9. The method of claim 8 wherein the liquid and/or gas is collected from the solids component by application of at least one of a positive pressure, a vacuum pressure, and heat to the solids component.

10. The method of claim 1 wherein performance of step (c) is stopped, and the solids component is dried prior to reaching the water/ethanol azeotropic point.

11. The method of claim 1 comprising performing step (c) up to or beyond the water/ethanol azeotropic point.

12. The method of claim 11 comprising performing step (c) until the moisture content is substantially entirely ethanol.

13. The method of claim 1 wherein the ethanol is produced by distillation of the liquid component of the fermentation products.

14. The method of claim 1 wherein the solids component comprises meal.

15. The method of claim 1 wherein in each of the steps the average temperature is maintained below 150° C.

* * * * *